US012758927B2

(12) United States Patent
Chawane et al.

(10) Patent No.: US 12,758,927 B2
(45) Date of Patent: Oct. 13, 2026

(54) EXHAUST AFTERTREATMENT SYSTEM INCLUDING MIXER WITH INJECTOR CONE

(71) Applicant: Cummins Emission Solutions Inc., Columbus, IN (US)

(72) Inventors: Chetan Kishorrao Chawane, Pune (IN); Enoch Nanduru, Pune (IN); Tushar Sudam Udhane, Pune (IN); Ryan M. Johnson, Cottage Grove, WI (US); Sagar Shekhar Andhari, Sindhudurga (IN); Nikhil Digambar Giri, Pune (IN); John G. Buechler, Indianapolis, IN (US); Ryan Aaron Petersen, Greenwood, IN (US); Supriya J. Magdum, Walwa (IN); Sandesh Raghunath Kirolkar, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 19/065,801

(22) Filed: Feb. 27, 2025

(65) Prior Publication Data

US 2025/0196074 A1 Jun. 19, 2025

Related U.S. Application Data

(63) Continuation of application No. PCT/US2023/031382, filed on Aug. 29, 2023.
(Continued)

(51) Int. Cl.
*B01F 23/213* (2022.01)
*B01F 25/30* (2022.01)
(Continued)

(52) U.S. Cl.
CPC ........ *B01F 23/2132* (2022.01); *F01N 3/2892* (2013.01); *B01F 23/21322* (2022.01);
(Continued)

(58) Field of Classification Search
CPC .......... F01N 1/086; F01N 1/088; F01N 3/206; F01N 3/2066; F01N 3/208; F01N 3/2821;
(Continued)

(56) References Cited

U.S. PATENT DOCUMENTS

| | | | |
|---|---|---|---|
| 9,341,097 | B2 | 5/2016 | Bays et al. |
| 9,482,154 | B2 | 11/2016 | Van Niekerk et al. |

(Continued)

FOREIGN PATENT DOCUMENTS

| | | | |
|---|---|---|---|
| DE | 10100054 | A1 | 7/2002 |
| EP | 3 068 523 | B1 | 9/2016 |

(Continued)

OTHER PUBLICATIONS

International Search Report and Written Opinion in PCT/US2023/031382 issued Jan. 24, 2024.

(Continued)

*Primary Examiner* — Binh Q Tran
(74) *Attorney, Agent, or Firm* — Foley & Lardner LLP

(57) ABSTRACT

An exhaust aftertreatment system includes an introduction gas conduit, a dosing module, and a mixer. The introduction conduit is centered on a conduit axis. The dosing module is coupled to the introduction conduit and includes an injector. The injector is configured to provide a hydrocarbon fluid into the introduction conduit and is defined by an injection axis. The mixer includes a mixer body, a first aperture, an injector plate, and an injector cone. The mixer body is disposed within the introduction conduit and is configured to receive exhaust and the hydrocarbon fluid. The first aperture extends through the mixer body and is configured to facili-
(Continued)

tate flow of the exhaust through the mixer body. The injector plate is coupled to the mixer body along the first aperture. A portion of the injector plate is angled at a first opening angle away from the mixer body. The injector cone is positioned on the injector plate. The injector cone includes an injection aperture configured to facilitate flow of the hydrocarbon fluid through the injector cone and the injector plate.

20 Claims, 15 Drawing Sheets

Related U.S. Application Data

(60) Provisional application No. 63/403,349, filed on Sep. 2, 2022.

(51) Int. Cl.

| | |
|---|---|
| ***B01F 25/431*** | (2022.01) |
| ***B01F 25/433*** | (2022.01) |
| ***F01N 1/08*** | (2006.01) |
| ***F01N 3/20*** | (2006.01) |
| ***F01N 3/28*** | (2006.01) |

(52) U.S. Cl.
CPC ....... *B01F 25/30* (2022.01); *B01F 25/431951* (2022.01); *B01F 25/431952* (2022.01); *B01F 25/4334* (2022.01); *B01F 25/4336* (2022.01); *F01N 1/086* (2013.01); *F01N 3/208* (2013.01); *F01N 3/2821* (2013.01); *F01N 2240/20* (2013.01); *F01N 2330/38* (2013.01); *F01N 2610/01* (2013.01)

(58) Field of Classification Search
CPC ............... F01N 3/2892; F01N 2240/20; F01N 2330/38; F01N 2610/01; F01N 2610/02; F01N 2610/03; F01N 2610/1453; F01N 2610/146; B01F 2025/931; B01F 23/213; B01F 23/2132; B01F 23/21322; B01F 25/102; B01F 25/103; B01F 25/1041; B01F 25/30; B01F 25/3131; B01F 25/3141; B01F 25/3142; B01F 25/40; B01F 25/431951; B01F 25/431952; B01F 25/431974; B01F 25/4334; B01F 25/4336; B01F 25/70; B01F 25/72
See application file for complete search history.

(56) References Cited

U.S. PATENT DOCUMENTS

| | | | | |
|---|---|---|---|---|
| 10,697,342 | B2 | 6/2020 | Abhyankar et al. | |
| 11,203,966 | B1 | 12/2021 | Dimpelfeld et al. | |
| 2009/0019843 | A1 | 1/2009 | Levin et al. | |
| 2012/0174561 | A1* | 7/2012 | Troxler | F01N 3/2066 60/274 |
| 2013/0333363 | A1 | 12/2013 | Joshi et al. | |
| 2014/0298781 | A1 | 10/2014 | Naga et al. | |
| 2014/0318112 | A1 | 10/2014 | Solbrig et al. | |
| 2015/0218996 | A1 | 8/2015 | Brandl et al. | |
| 2016/0013007 | A1 | 1/2016 | Du et al. | |
| 2016/0319724 | A1* | 11/2016 | Alano | F01N 3/2066 |
| 2016/0361694 | A1 | 12/2016 | Brandl et al. | |
| 2019/0118146 | A1 | 4/2019 | Brandl et al. | |
| 2019/0201854 | A1* | 7/2019 | Cvelbar | B01D 53/90 |
| 2019/0323402 | A1* | 10/2019 | Tucker | B01F 25/3141 |
| 2020/0271035 | A1* | 8/2020 | Gattani | B01F 23/2326 |
| 2021/0062703 | A1* | 3/2021 | Kimura | B01F 25/4231 |
| 2021/0071559 | A1 | 3/2021 | Kinnaird | |
| 2021/0340896 | A1* | 11/2021 | Albert | B01F 23/2132 |
| 2022/0205378 | A1 | 6/2022 | Ringstad et al. | |
| 2022/0298949 | A1* | 9/2022 | Chiruta | B01F 25/432 |
| 2022/0349330 | A1* | 11/2022 | Chapman | B01F 23/2132 |
| 2022/0381170 | A1 | 12/2022 | Lohmann et al. | |

FOREIGN PATENT DOCUMENTS

| | | | |
|---|---|---|---|
| GB | 2 595 019 | A | 11/2021 |
| WO | WO-2020/236158 | A1 | 11/2020 |
| WO | WO-2020/250015 | A1 | 12/2020 |
| WO | WO-2021/050157 | A1 | 3/2021 |
| WO | WO-2022/169775 | A1 | 8/2022 |
| WO | WO-2023/009473 | A1 | 2/2023 |
| WO | WO-2024/049811 | A1 | 3/2024 |
| WO | WO-2024/163749 | A1 | 8/2024 |

OTHER PUBLICATIONS

International Search Report and Written Opinion in PCT/US2024/032821 issued Aug. 28, 2024.
International Search Report and Written Opinion in PCT/US2024/14018 issued May 21, 2024.

* cited by examiner

EXHAUST AFTERTREATMENT SYSTEM INCLUDING MIXER WITH INJECTOR CONE

CROSS-REFERENCE TO RELATED APPLICATION

The present application is a bypass continuation of PCT Application No. PCT/US2023/031382, filed Aug. 29, 2023 which claims priority to and the benefit of U.S. Provisional Patent Application No. 63/403,349, filed Sep. 2, 2022. The entire disclosures of these applications are hereby incorporated by reference herein.

TECHNICAL FIELD

The present disclosure relates generally to an exhaust aftertreatment system for an internal combustion engine.

BACKGROUND

For an internal combustion engine system, it may be desirable to treat exhaust produced by a combustion of fuel by an internal combustion engine. The exhaust can be treated using an aftertreatment system. One approach that can be implemented in an aftertreatment system is to dose the exhaust with a reductant and pass the exhaust and reductant through a catalyst member. It may desirable to cause the exhaust and the reductant to swirl upstream of the catalyst member so as to increase mixing of the exhaust and the reductant. However, this swirling may not be capable of providing sufficient mixing in some applications.

SUMMARY

In one embodiment, an exhaust aftertreatment system includes an introduction gas conduit, a dosing module, and a mixer. The introduction conduit is centered on a conduit axis. The dosing module is coupled to the introduction conduit and includes an injector. The injector is configured to provide a hydrocarbon fluid into the introduction conduit and is defined by an injection axis. The mixer includes a mixer body, a first aperture, an injector plate, and an injector cone. The mixer body is disposed within the introduction conduit and is configured to receive exhaust and the hydrocarbon fluid. The first aperture extends through the mixer body and is configured to facilitate flow of the exhaust through the mixer body. The injector plate is coupled to the mixer body along the first aperture. A portion of the injector plate is angled at a first opening angle away from the mixer body. The injector cone is positioned on the injector plate. The injector cone includes an injection aperture configured to facilitate flow of the hydrocarbon fluid through the injector cone and the injector plate.

In one embodiment, an exhaust aftertreatment system includes an introduction gas conduit, a dosing module, a mixer, an inlet flange, and a louver. The introduction conduit is centered on a conduit axis. The dosing module is coupled to the introduction conduit and includes an injector. The injector is configured to provide a hydrocarbon fluid into the introduction conduit and is defined by an injection axis. The mixer includes a mixer body, a first aperture, an injector plate, and an injector cone. The mixer body is disposed within the introduction conduit and is configured to receive exhaust and the hydrocarbon fluid. The first aperture extends through the mixer body and is configured to facilitate flow of the exhaust through the mixer body. The injector plate is coupled to the mixer body along the first aperture. A portion of the injector plate is angled at a first opening angle away from the mixer body. The injector cone is positioned on the injector plate. The injector cone includes an injection aperture configured to facilitate flow of the hydrocarbon fluid through the injector cone and the injector plate. The inlet flange includes an inlet flange aperture and a louver. The inlet flange aperture extends through the inlet flange. The inlet flange aperture is configured to facilitate flow of the exhaust through the inlet flange and into the mixer body. The louver extends from the inlet flange to within the mixer body along a portion of the inlet flange aperture. The louver is configured to receive the exhaust flowing through the inlet flange aperture.

In another embodiment, a mixer for an exhaust aftertreatment system includes a mixer body centered on a mixer body center axis and is configured to receive exhaust and a hydrocarbon fluid. The mixer further includes a first aperture extending through the mixer body. The first aperture is configured to facilitate flow of exhaust through the mixer body. The mixer includes a first guide plate coupled to the mixer body along a portion of the first aperture and is centered on a first guide plate center axis. The first guide plate includes a first guide plate first flange and a first guide plate second flange configured to couple a portion of first guide plate to the mixer body. The first guide plate also includes a first guide plate panel contiguous with each of the first guide plate second flange. The first guide plate panel forms a first guide plate flow aperture. The first guide plate further includes a first guide plate sidewall is contiguous with the first guide plate first flange and the first guide plate panel. The first guide plate sidewall is configured to facilitate flow between the first guide plate panel and the mixer body. The mixer also includes a first guide plate tab positioned within and along a portion of the second aperture and is contiguous with the first guide plate panel. The first guide plate tab is configured to couple the first guide plate to the mixer body and prevent flow of the exhaust along an edge of the first guide plate panel.

In another embodiment, an aftertreatment system includes a mixer. The mixer includes a mixer body defining a mixer body cavity. The mixer body is centered on a mixer body center axis and is configured to receive exhaust and a hydrocarbon fluid. The mixer body is configured to receive exhaust and a hydrocarbon fluid. The mixer also includes a first aperture, a second aperture, and a third aperture extending through the mixer body. Each of the first aperture, the second aperture, and the third aperture are configured to facilitate flow of the exhaust through the mixer body. The mixer also includes an injector plate coupled to the mixer body along a portion of the first aperture and centered on a reference axis. The injector plate defines an injector plate aperture angled at a first opening angle away from the mixer body. The mixer further includes a first guide plate coupled to the mixer body along a portion of the second aperture adjacent to the injector plate. A portion of the first guide plate is angled at a second opening angle from the mixer body and defines a first guide plate flow aperture. The mixer also includes a second guide plate coupled to the mixer body along a portion of the third aperture adjacent to the injector plate opposite the first guide plate. A portion of the second guide plate is angled at a third opening angle from the mixer body and defines a second guide plate flow aperture. The aftertreatment system also includes an injector cone positioned on the injector plate. The injector cone includes an injection aperture configured to facilitate flow of the hydrocarbon fluid through the injector cone and the injector plate along an injection axis. The first guide plate flow aperture is configured to facilitate the flow of exhaust into the mixer cavity away from the injection axis and the second guide plate flow aperture is configured to facilitate the flow of the exhaust into the mixer cavity toward the injection axis plate to facilitate swirling of the exhaust.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
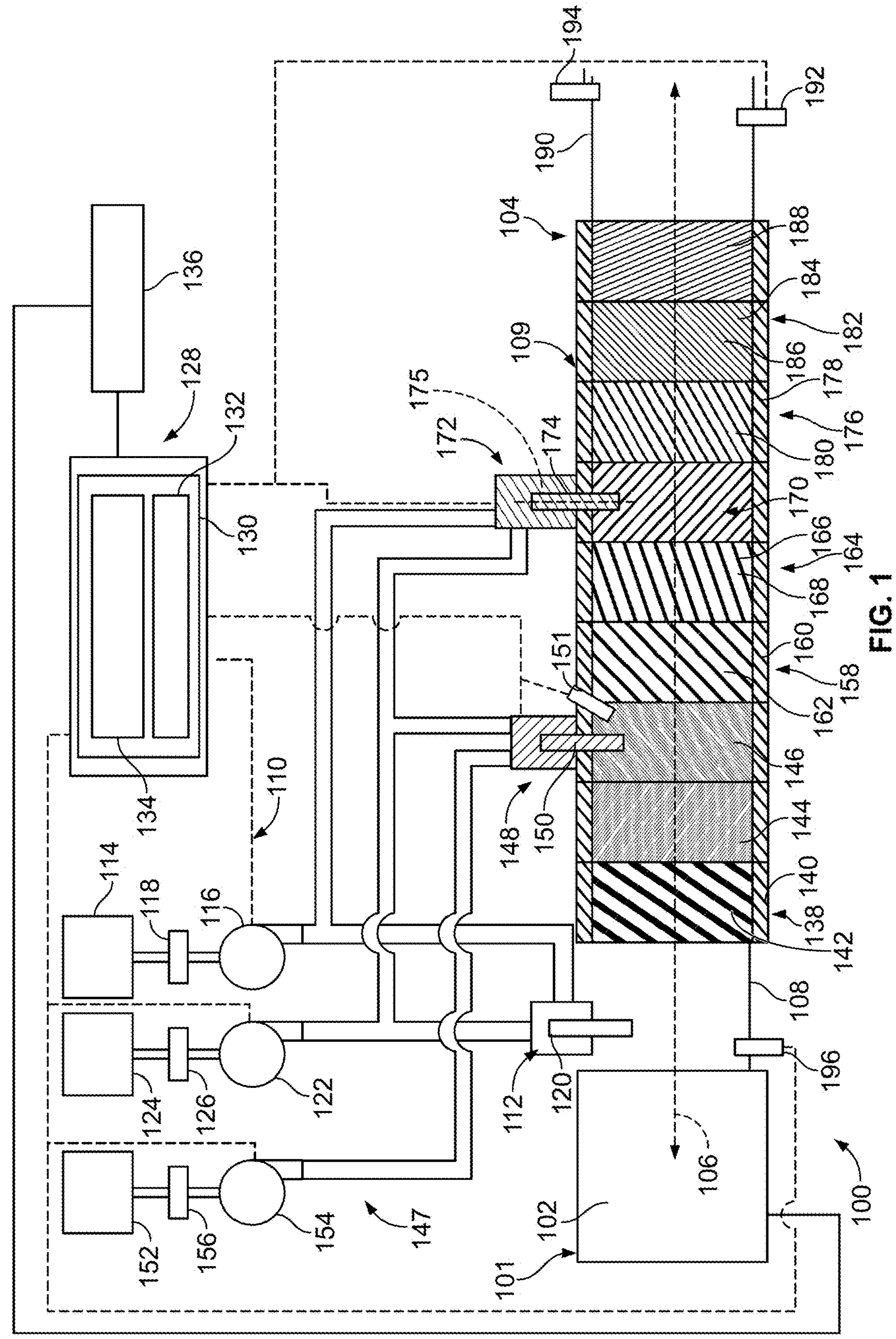
FIG. 1 is a cross-sectional view of a portion of an example exhaust aftertreatment system.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for treating exhaust of an internal combustion engine with an exhaust aftertreatment system (or simply "aftertreatment system"). The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to facilitate efficient regeneration of downstream components, it may be desirable to increase the ability for the exhaust to raise in temperature. This may be done using a hydrocarbon fluid. The temperature of the exhaust may be enhanced by increasing mixing of the hydrocarbon fluid and the exhaust within a mixer.

Various devices may be used in order to mix the hydrocarbon fluid and the exhaust. For example, a device may be used to cause swirling of the exhaust, and this swirling cause dispersal of the hydrocarbon in the exhaust. However, it may be possible to further increase the mixing of the hydrocarbon fluid in the exhaust by providing additional mechanisms for causing dispersal of the hydrocarbon fluid in the exhaust such that when the mixture is ignited the temperature of the exhaust increases.

Implementations herein are directed to an aftertreatment system that includes a mixer which has a mixer body. The mixer body includes a first aperture and an injector plate coupled to the mixer body along a portion of the first aperture and angled away from the mixer body. The mixer body also includes a second aperture and a third aperture and a first guide plate and a second guide plate coupled to the mixer body. As the exhaust flows through an inlet flange, the exhaust is directed around the mixer and toward the injector plate, the first guide plate, and the second guide plate. Each of the injector plate, first guide plate, and the second guide plate facilitate flow through the first aperture, the second aperture, and the third aperture, respectively which causes the exhaust to swirl within the mixer body as a hydrocarbon fluid is injected into the exhaust. By facilitating the flow through the first aperture, second aperture, and third aperture, the hydrocarbon fluid is dispersed such that when the mixture is ignited, a greater number of hydrocarbons ignite which increases the efficiency of the regeneration process. Further, by facilitating flow of the exhaust through the first aperture, second aperture, and third aperture by the injector plate, first guide plate, and second guide plate respectively, the backpressure on the system is reduced.

II. Overview of Aftertreatment System

Figure 2:
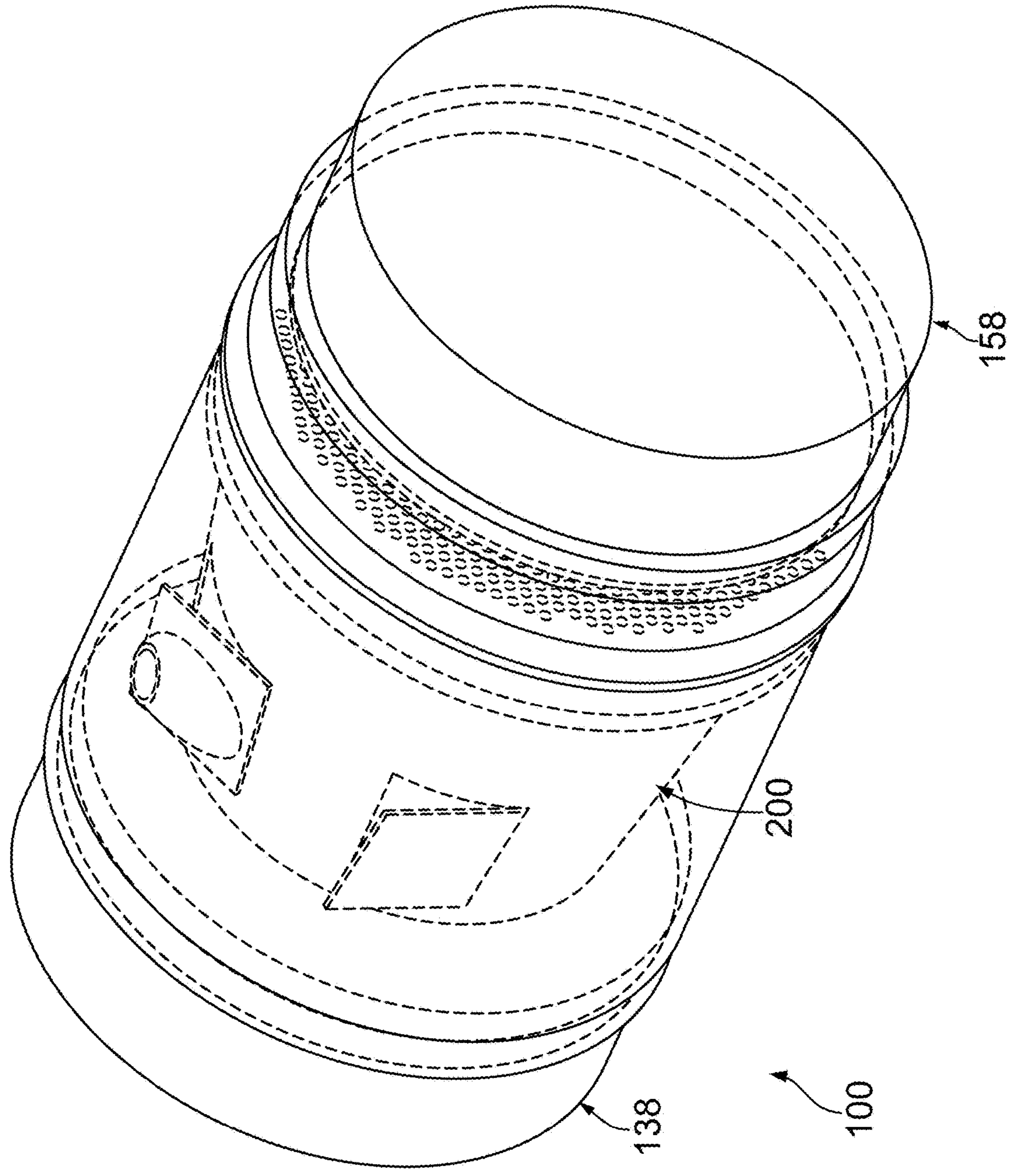
FIG. 2 is a perspective view of a portion of the exhaust aftertreatment system of FIG. 1.
Figure 3:
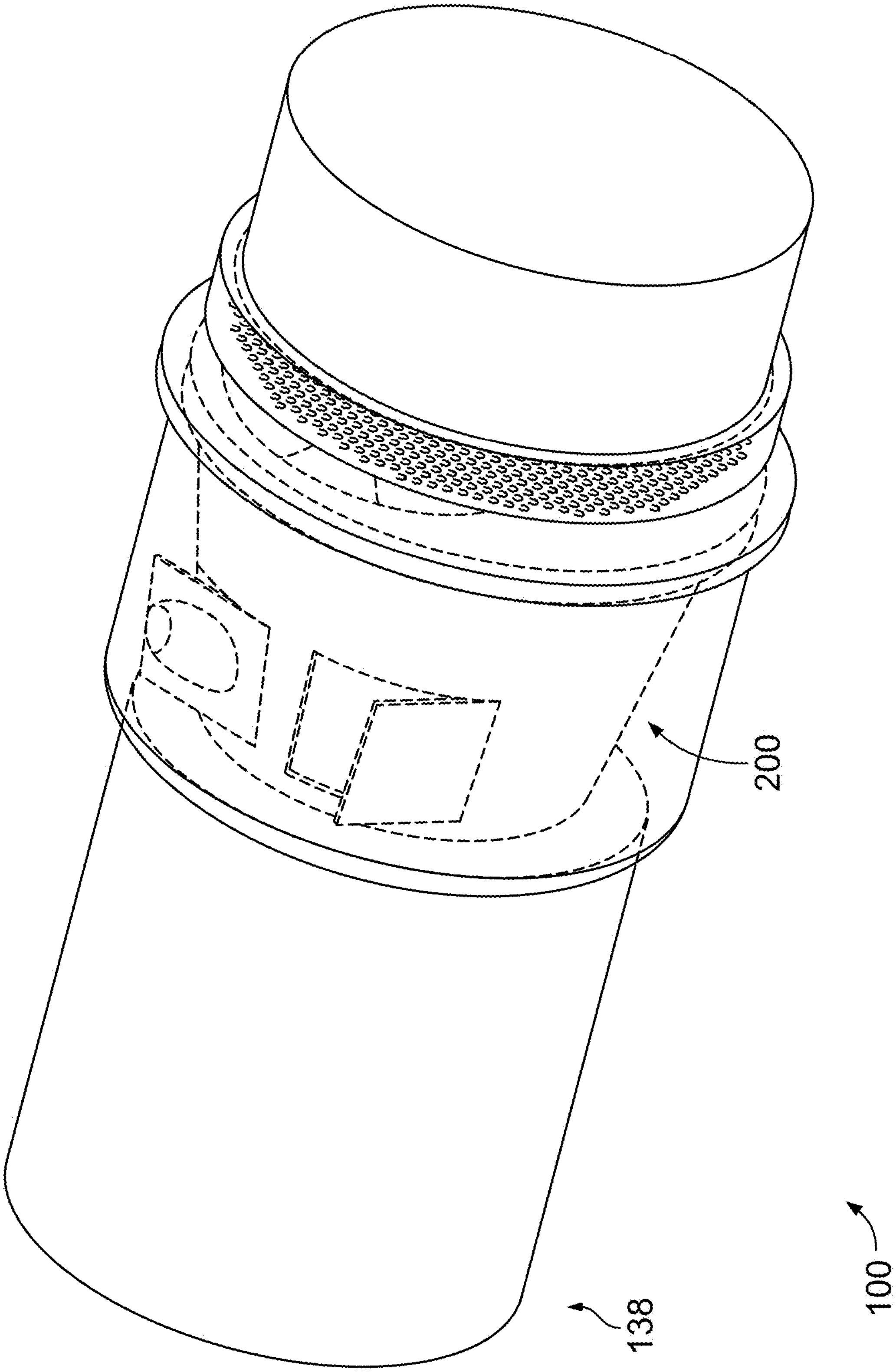
FIG. 3 is a perspective view of a portion the exhaust aftertreatment system of FIG. 1 from downstream looking upstream.

FIG. 1-3 depict an aftertreatment system 100 (e.g., treatment system, etc.) for an internal combustion engine system 101. The internal combustion engine system 101 includes an internal combustion engine (e.g., diesel internal combustion engine, gasoline internal combustion engine, hybrid internal combustion engine, propane internal combustion engine, dual-fuel internal combustion engine, etc.). The internal combustion engine system 101 includes a turbocharger 102. The aftertreatment system 100 is configured to treat exhaust produced by the internal combustion engine. As is explained in more detail herein, the aftertreatment system 100 is configured to facilitate treatment of the exhaust. The treatment may facilitate reduction of emission of undesirable components (e.g., nitrogen oxides ($NO_x$), Sulfur Oxide ($SO_x$), etc.) in the exhaust. The treatment may also or instead facilitate conversion of various oxidation components (e.g., carbon monoxide (CO), hydrocarbons, etc.) of the exhaust into other components (e.g., $CO_2$, water vapor, etc.). The treatment may also or instead facilitate removal of particulates (e.g., soot, particulate matter, etc.) from the exhaust.

The aftertreatment system 100 includes an exhaust conduit system 104 (e.g., line system, pipe system, etc.). The exhaust conduit system 104 is configured to facilitate routing of the exhaust produced by the internal combustion engine throughout the aftertreatment system 100 and to atmosphere (e.g., ambient environment, etc.). The exhaust conduit system 104 is centered on a conduit axis 106 (e.g., the conduit axis 106 extends through a center point of the exhaust conduit system 104, etc.). As used herein, the term "axis" describes a theoretical line extending through the centroid (e.g., center of mass, etc.) of an object. The object is centered on the axis. The object is not necessarily cylindrical (e.g., a non-cylindrical shape may be centered on an axis, etc.).

The exhaust conduit system 104 includes an intake chamber 108 (e.g., line, pipe, etc.). The intake chamber 108 is configured to receive exhaust from the internal combustion engine. The intake chamber 108 may receive exhaust from a portion of the internal combustion engine (e.g., header on the internal combustion engine, exhaust manifold on the internal combustion engine, the internal combustion engine, etc.). In some embodiments, the intake chamber 108 is coupled (e.g., attached, fixed, welded, fastened, riveted, adhesively attached, bonded, pinned, press-fit, etc.) to the internal combustion engine. In other embodiments, the intake chamber 108 is integrally formed with the internal combustion engine. As utilized herein, two or more elements are "integrally formed" with each when the two or more elements are formed and joined together as part of a single manufacturing process to create a single-piece or unitary construction that cannot be disassembled without an at least partial destruction of the overall component. The intake chamber 108 may be centered on the conduit axis 106 (e.g., the conduit axis 106 extends through a center point of the intake chamber 108, etc.). In some embodiments, the intake chamber 108 may be offset from the conduit axis 106 (e.g., the conduit axis 106 extends adjacent to a center point of the intake chamber 108, etc.).

In some embodiments, the exhaust conduit system 104 also includes an introduction conduit 109 (e.g., decomposition housing, decomposition reactor, decomposition chamber, reactor pipe, decomposition tube, reactor tube, etc.). The introduction conduit 109 is configured to receive exhaust from the intake chamber 108. In various embodiments, the introduction conduit 109 is coupled to the intake chamber 108. For example, the introduction conduit 109 may be fastened (e.g., using a band, using bolts, using twist-lock fasteners, threaded, etc.), welded, riveted, or otherwise attached to the intake chamber 108. In other embodiments, the introduction conduit 109 is integrally formed with the intake chamber 108. As utilized herein, the terms "fastened," "fastening," and the like, describe attachment (e.g., joining, etc.) of two structures in such a way that detachment (e.g., separation, etc.) of the two structures remains possible while "fastened" or after the "fastening" is completed, without destroying or damaging either or both of the two structures. The introduction conduit 109 is centered on the conduit axis 106 (e.g., the conduit axis 106 extends through a center point of the introduction conduit 109, etc.). In some embodiments, the introduction conduit 109 is formed by the coupling of the individual housings and chambers, as described herein.

The aftertreatment system 100 also includes a reductant fluid delivery system 110. As is explained in more detail herein, the reductant fluid delivery system 110 is configured to facilitate the introduction of a reductant fluid, such as a reductant (e.g., diesel exhaust fluid (DEF), Adblue®, a urea-water solution (UWS), an aqueous urea solution, AUS32, etc.) into the exhaust within the exhaust. When the reductant is introduced into the exhaust, reduction of emission of undesirable components in the exhaust using the aftertreatment system 100 may be facilitated. When the hydrocarbon is introduced into the exhaust, the temperature of the exhaust may be increased (e.g., to facilitate regeneration of components of the aftertreatment system 100, etc.). For example, the temperature of the exhaust may be increased by combusting the hydrocarbon within the exhaust (e.g., using a spark plug, etc.).

The reductant fluid delivery system 110 includes an intake chamber dosing module 112 (e.g., doser, reductant doser, etc.). The intake chamber dosing module 112 is configured to facilitate passage of the reductant fluid through the intake chamber 108 and into intake chamber 108. In some embodiments, the intake chamber dosing module 112 is positioned within a dosing module mount. The dosing module mount is configured to facilitate mounting of the intake chamber dosing module 112 to the intake chamber 108. The dosing module mount may provide insulation (e.g., thermal insulation, vibrational insulation, etc.) between the intake chamber dosing module 112 and the intake chamber 108. In some embodiments, the reductant fluid delivery system 110 does not include the intake chamber dosing module 112. In some embodiments the dosing module 112 is a close coupled dosing module. That is, the dosing module 112 is coupled to the introduction conduit 109 proximate an outlet of the internal combustion engine system 101 (e.g., proximate an outlet of the engine and/or proximate an outlet of the turbocharger 102). For example, the dosing module 112 may be coupled to the introduction conduit 109 downstream from the internal combustion engine system 101 and/or the turbocharger 102.

The reductant fluid delivery system 110 also includes a reductant fluid source 114 (e.g., reductant tank, etc.). The reductant fluid source 114 is configured to contain the reductant fluid. The reductant fluid source 114 is configured to provide the reductant fluid to the intake chamber dosing module 112. The reductant fluid source 114 may include multiple reductant fluid sources 114 (e.g., multiple tanks connected in series or in parallel, etc.). The reductant fluid source 114 may be, for example, a diesel exhaust fluid tank containing Adblue®.

The reductant fluid delivery system 110 also includes a reductant fluid pump 116 (e.g., supply unit, etc.). The reductant fluid pump 116 is configured to receive the reductant fluid from the reductant fluid source 114 and to provide the reductant fluid to the intake chamber dosing module 112. The reductant fluid pump 116 is used to pressurize the reductant fluid from the reductant fluid source 114 for delivery to the intake chamber dosing module 112. In some embodiments, the reductant fluid pump 116 is pressure controlled. In some embodiments, the reductant fluid pump 116 is coupled to a chassis of a vehicle associated with the aftertreatment system 100.

In some embodiments, the reductant fluid delivery system 110 also includes a reductant fluid filter 118. The reductant fluid filter 118 is configured to receive the reductant fluid from the reductant fluid source 114 and to provide the reductant fluid to the reductant fluid pump 116. The reductant fluid filter 118 filters the reductant fluid prior to the reductant fluid being provided to internal components of the reductant fluid pump 116. For example, the reductant fluid filter 118 may inhibit or prevent the transmission of solids to the internal components of the reductant fluid pump 116. In this way, the reductant fluid filter 118 may facilitate prolonged desirable operation of the reductant fluid pump 116.

The intake chamber dosing module 112 includes at least one intake chamber dosing module injector 120 (e.g., insertion device, etc.). The intake chamber dosing module injector 120 configured to receive the reductant fluid from the reductant fluid pump 116. The intake chamber dosing module injector 120 is configured to dose (e.g., provide, inject, insert, etc.) the reductant fluid received by the intake chamber dosing module 112 into the exhaust within the intake chamber 108.

In some embodiments, the reductant fluid delivery system 110 also includes an air pump 122 and an air source 124 (e.g., air intake, etc.). The air pump 122 is configured to receive air from the air source 124. The air pump 122 is configured to provide the air to the intake chamber dosing module 112. In some applications, the intake chamber dosing module 112 is configured to mix the air and the reductant fluid into an air-reductant fluid mixture and to provide the air-reductant fluid mixture to the intake chamber dosing module injector 120 (e.g., for dosing into the exhaust within the intake chamber 108, etc.). As used herein, it is understood that a reductant fluid may include or consistent of an air-reductant fluid mixture.

The intake chamber dosing module injector 120 is configured to receive the air from the air pump 122. The intake chamber dosing module injector 120 is configured to dose the air into the exhaust within the intake chamber 108. In some of these embodiments, the reductant fluid delivery system 110 also includes an air filter 126. The air filter 126 is configured to receive the air from the air source 124 and to provide the air to the air pump 122. The air filter 126 is configured to filter the air prior to the air being provided to the air pump 122. In other embodiments, the reductant fluid delivery system 110 does not include the air pump 122 and/or the reductant fluid delivery system 110 does not include the air source 124. In such embodiments, the intake chamber dosing module 112 is not configured to mix the reductant fluid with the air.

In various embodiments, the intake chamber dosing module 112 is configured to receive air and fluid, and doses the reductant fluid into the intake chamber 108. In various embodiments, the intake chamber dosing module 112 is configured to receive reductant fluid (and does not receive air), and doses the reductant fluid into the intake chamber 108. In various embodiments, the intake chamber dosing module 112 is configured to receive reductant fluid, and doses the reductant fluid into the intake chamber 108. In various embodiments, the intake chamber dosing module 112 is configured to receive air and reductant fluid, and doses the reductant fluid into the intake chamber 108.

The aftertreatment system 100 also includes an aftertreatment system controller 128 (e.g., control circuit, driver, etc.). The intake chamber dosing module 112, the reductant fluid pump 116, and the air pump 122 are also electrically or communicatively coupled to the aftertreatment system controller 128. The aftertreatment system controller 128 is configured to control the intake chamber dosing module 112 to dose the reductant fluid into the intake chamber 108. The aftertreatment system controller 128 may also be configured to control the reductant fluid pump 116 and/or the air pump 122 in order to control the reductant fluid that is dosed into the intake chamber 108.

The aftertreatment system controller 128 includes an aftertreatment system processing circuit 130. The aftertreatment system processing circuit 130 includes an aftertreatment system processor 132 and an aftertreatment system memory 134. The aftertreatment system processor 132 may include a microprocessor, an application-specific integrated circuit (ASIC), a field-programmable gate array (FPGA), etc., or combinations thereof. The aftertreatment system memory 134 may include, but is not limited to, electronic, optical, magnetic, or any other storage or transmission device capable of providing a processor, ASIC, FPGA, etc. with program instructions. The aftertreatment system memory 134 may include a memory chip, Electrically Erasable Programmable Read-Only Memory (EEPROM), Erasable Programmable Read Only Memory (EPROM), flash memory, or any other suitable memory from which the aftertreatment system controller 128 can read instructions. The instructions may include code from any suitable programming language. The aftertreatment system memory 134 may include various modules that include instructions that are configured to be implemented by the aftertreatment system processor 132.

In various embodiments, the aftertreatment system controller 128 is configured to communicate with a central controller 136 (e.g., engine control unit (ECU), engine control module (ECM), etc.) to control the turbocharger 102. The turbocharger 102 includes a compressor wheel coupled to an exhaust turbine wheel via a connector shaft, where hot exhaust spin the turbine wheel, which rotates the shaft and the compressor to draw air in. By compressing the air, the turbocharger 102 allows for more air to enter the cylinders (or combustion chamber) to burn more fuel and increase power and efficiency. The turbocharger 102 may include a heat exchanger to cool the compressed air before the air enters the cylinders.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state and an alarm state based on a communication from the central controller 136. By changing state, the display device may provide an indication to a user of a status of the reductant fluid delivery system 110.

The aftertreatment system 100 includes an upstream catalyst member 138 (e.g., conversion catalyst member, selective catalytic reduction (SCR) catalyst member, catalytic metals, etc.). The upstream catalyst member 138 is positioned downstream of the intake chamber 108. The upstream catalyst member 138 is configured to cause decomposition of components of the exhaust using the reductant fluid (e.g., via catalytic reactions, etc.). The upstream catalyst member 138 includes an upstream catalyst housing 140. The upstream catalyst housing 140 may be coupled to the intake chamber 108. In some embodiments, the upstream catalyst housing 140 is integrally formed with the intake chamber 108. The upstream catalyst member 138 includes an upstream catalyst substrate 142. The upstream catalyst substrate 142 is coupled to the upstream catalyst housing 140. In some embodiments, the upstream catalyst substrate 142 is integrally formed with the upstream catalyst housing 140.

The upstream catalyst member 138 receives the exhaust from the intake chamber 108. The exhaust flows through the upstream catalyst substrate 142 and reacts with the upstream catalyst substrate 142 so as to cause the exhaust to undergo the processes of evaporation, thermolysis, and/or hydrolysis to form non-$NO_x$ emissions within the introduction conduit 109 and/or the upstream catalyst member 138. In some embodiments, the exhaust and the reductant fluid within the exhaust react with the upstream catalyst substrate 142. In this way the upstream catalyst member 138 is configured to assist the reduction of $NO_x$ emissions by accelerating a $NO_x$ reduction process between the reductant and the $NO_x$ of the exhaust into diatomic nitrogen, water, and/or carbon dioxide. The upstream catalyst substrate 142 may include vanadia. Vanadia is used due to the lengthy deactivation time and the ability to react with the exhaust at high temperatures. In some embodiments, vanadia is used because of the benefit of emitting lower $N_2O$ emissions into the environment when exhaust temperatures are below 420° C. In some embodiments, the aftertreatment system 100 does not include an upstream catalyst member 138.

The aftertreatment system 100 includes an upstream ammonia slip catalyst substrate 144. The upstream ammonia slip catalyst substrate 144 is positioned downstream of the upstream catalyst member 138. In some embodiments, the upstream ammonia slip catalyst substrate 144 is a coating applied to a portion of the outlet of the upstream catalyst member 138. The upstream ammonia slip catalyst substrate 144 is configured to receive the exhaust from the upstream catalyst member 138 and assist in the reduction of the byproducts (e.g., ammonia, etc.) of the processes of the intake chamber dosing module 112 and the upstream catalyst member 138. Specifically, the intake chamber dosing module 112 may introduce ammonia into the exhaust, however a portion of the ammonia introduced may not react with the exhaust. As a result, excess ammonia may slip from the upstream catalyst member 138 into the exhaust downstream of the upstream catalyst member 138. The upstream ammonia slip catalyst substrate 144 functions to reduce the ammonia such that the exhaust downstream of the upstream ammonia slip catalyst substrate 144 does not contain an undesirable amount of ammonia. In some embodiments, the aftertreatment system 100 does not include the upstream ammonia slip catalyst substrate 144.

The aftertreatment system 100 also includes a hydrocarbon decomposition chamber 146. The hydrocarbon decomposition chamber is positioned downstream of the upstream ammonia slip catalyst substrate 144. In some embodiments the hydrocarbon decomposition chamber 146 is coupled to the upstream catalyst housing 140. In some embodiments, the hydrocarbon decomposition chamber 146 is integrally formed with the upstream catalyst housing 140. In still other embodiments, the hydrocarbon decomposition chamber 146 is coupled to the intake chamber 108. In some embodiments, the aftertreatment system 100 does not include the upstream catalyst member 138 such that the hydrocarbon decomposition chamber 146 may also be integrally formed with the intake chamber 108. The hydrocarbon decomposition chamber 146 is configured to receive the exhaust from the upstream ammonia slip catalyst substrate 144. The aftertreatment system 100 includes a hydrocarbon fluid system 147. The hydrocarbon fluid system 147 includes a hydrocarbon dosing module 148. The hydrocarbon dosing module 148 doses the exhaust within the hydrocarbon decomposition chamber 146 with hydrocarbons. The hydrocarbon dosing module 148 is configured to facilitate passage of hydrocarbon through the hydrocarbon decomposition chamber 146 and into the hydrocarbon decomposition chamber 146. The hydrocarbon dosing module 148 includes at least one hydrocarbon injector 150 (e.g., insertion device, etc.). The hydrocarbon injector 150 is configured to dose the hydrocarbons into the exhaust within the hydrocarbon decomposition chamber 146.

The hydrocarbons within the hydrocarbon decomposition chamber 146 may be configured to increase the temperature of the exhaust within the hydrocarbon decomposition chamber 146. Specifically, the aftertreatment system 100 includes an igniter 151 (e.g., spark plug, etc.,) coupled to the hydrocarbon decomposition chamber 146. The igniter 151 is electrically connected to the aftertreatment system controller 128 and is configured to combust the hydrocarbons in the exhaust within the hydrocarbon decomposition chamber 146 which causes the increase in temperature of the exhaust. Consequently, regeneration of downstream components may occur. For example, regeneration occurs when the hydrocarbons in the exhaust combust and increase the temperature of the exhaust such that the exhaust burns any soot or particles which may be affixed to the downstream components. By burning the affixed soot or particles, the downstream components may be cleaned off such that they are like new and operate as such.

The hydrocarbon fluid system 147 further includes a hydrocarbon source 152 (e.g., hydrocarbon tank, etc.). The hydrocarbon source 152 is configured to contain hydrocarbon. The hydrocarbon source 152 is configured to provide hydrocarbons to the hydrocarbon dosing module 148. The hydrocarbon source 152 may include multiple hydrocarbon sources 152 (e.g., multiple tanks connected in series or in parallel, etc.). The hydrocarbon fluid system 147 also includes a hydrocarbon fluid pump 154. Specifically, the hydrocarbon fluid pump 154 is configured to provide hydrocarbon fluid to the hydrocarbon injector 150. The hydrocarbon injector 150 receives hydrocarbon fluid from the hydrocarbon fluid pump 154 and is configured to dose the hydrocarbon fluid received by the hydrocarbon dosing module 148 into the exhaust within the hydrocarbon decomposition chamber 146. The hydrocarbon fluid pump 154 is used to pressurize the hydrocarbon fluid received from the hydrocarbon source 152 for delivery to the hydrocarbon dosing module 148 and the hydrocarbon injector 150. In some embodiments, the hydrocarbon fluid pump 154 is pressure controlled. In some embodiments, the hydrocarbon fluid pump 154 is coupled to a chassis of a vehicle associated with the aftertreatment system.

In some embodiments, the hydrocarbon fluid system 147 includes a hydrocarbon filter 156 (e.g., fuel filter, lubricant filter, oil filter, etc.). The hydrocarbon filter 156 is configured to receive the hydrocarbons from the hydrocarbon source 152 and to provide the hydrocarbons to the hydrocarbon fluid pump 154. The hydrocarbon filter 156 filters the hydrocarbons prior to the hydrocarbons being provided to internal components of the hydrocarbon fluid pump 154. For example, the hydrocarbon filter 156 may inhibit or prevent the transmission of solids to the internal components of the hydrocarbon fluid pump 154. In this way, the hydrocarbon filter 156 may facilitate prolonged desirable operation of the hydrocarbon fluid pump 154.

In some embodiments, the air pump 122 is also configured to provide the air to the hydrocarbon dosing module 148. The hydrocarbon dosing module 148 is configured to provide the air into the hydrocarbon decomposition chamber 146. In some applications, the hydrocarbon dosing module 148 is configured to mix the air and the hydrocarbon fluid into an air-hydrocarbon fluid mixture and to provide the air-hydrocarbon fluid mixture to the hydrocarbon injector 150 (e.g., for dosing into the exhaust within the hydrocarbon decomposition chamber 146, etc.).

In various embodiments, the hydrocarbon dosing module 148 is configured to receive air and hydrocarbon fluid, and doses the hydrocarbon fluid into the hydrocarbon decomposition chamber 146. In various embodiments, the hydrocarbon dosing module 148 is configured to receive hydrocarbons (and does not receive air), and doses the hydrocarbon fluid into the intake chamber 108. In various embodiments, the hydrocarbon dosing module 148 is configured to receive hydrocarbons, and doses the hydrocarbon into the hydrocarbon decomposition chamber 146.

In some embodiments, the hydrocarbon dosing module 148 and the hydrocarbon fluid pump 154 are also electrically or communicatively coupled to the aftertreatment system controller 128. The aftertreatment system controller 128 is further configured to control the hydrocarbon dosing module 148 to dose the hydrocarbon into the hydrocarbon decomposition chamber 146. The aftertreatment system controller 128 may also be configured to control the hydrocarbon fluid pump 154 and/or the air pump 122 in order to control the hydrocarbon that is dosed into the hydrocarbon decomposition chamber 146. In some embodiments, the aftertreatment system 100 does not include the hydrocarbon decomposition chamber 146, the hydrocarbon dosing module 148, the hydrocarbon injector 150, the hydrocarbon source 152, the hydrocarbon fluid pump 154, and/or the hydrocarbon filter 156.

The aftertreatment system 100 includes a first oxidation catalyst member 158 (e.g., first diesel oxidation catalyst (DOC), etc.). The first oxidation catalyst member 158 is positioned downstream of hydrocarbon decomposition chamber 146 (i.e., the hydrocarbon decomposition chamber 146 is positioned upstream of the first oxidation catalyst member 158).

The first oxidation catalyst member 158 includes a first oxidation catalyst housing 160. The first oxidation catalyst housing 160 is coupled to hydrocarbon decomposition chamber 146. The first oxidation catalyst housing 160 may also be integrally formed with the hydrocarbon decomposition chamber 146.

The first oxidation catalyst member 158 also includes a first oxidation catalyst substrate 162 (e.g., DOC, etc.). The first oxidation catalyst substrate 162 is positioned within the first oxidation catalyst housing 160. The first oxidation catalyst substrate 162 may be coupled to the first oxidation catalyst housing 160. The exhaust including hydrocarbons react with the first oxidation catalyst substrate 162 and cause the conversion hydrocarbons in the exhaust. For example, as the exhaust flows the through the first oxidation catalyst substrate 162, the hydrocarbons react with the first oxidation catalyst substrate 162 and began to oxidize. The first oxidation catalyst substrate 162 facilitates conversion of the carbon monoxide in the exhaust and the hydrocarbons and/or the air-hydrocarbon mixture into carbon dioxide.

In some embodiments, the aftertreatment system 100 does not include the upstream catalyst member 138, the upstream ammonia slip catalyst substrate 144, and/or the hydrocarbon decomposition chamber 146 such that the first oxidation catalyst member 158 may be positioned downstream of the intake chamber 108. In such embodiments, the first oxidation catalyst housing 160 may be coupled to the intake chamber 108. In other such embodiments, the first oxidation catalyst housing 160 may also be integrally formed with the intake chamber 108.

The aftertreatment system 100 also includes an upstream particulate filter assembly 164. The upstream particulate filter assembly 164 includes an upstream particulate filter housing 166. The upstream particulate filter housing 166 is positioned downstream of the first oxidation catalyst housing 160. In some embodiments, the upstream particulate filter housing 166 is integrally formed with the first oxidation catalyst housing 160. The upstream particulate filter assembly 164 includes an upstream particulate filter 168 (e.g., diesel particulate filter (DPF), filtration member, etc.). The upstream particulate filter 168 is disposed within the upstream particulate filter housing 166 such that the upstream particulate filter 168 is positioned downstream of the first oxidation catalyst member 158 (i.e., the first oxidation catalyst member 158 is positioned upstream of the upstream particulate filter 168). In some embodiments, the upstream particulate filter housing 166 and the upstream particulate filter 168 are positioned downstream of the intake chamber 108.

The upstream particulate filter 168 is configured to remove first particulates (e.g., soot, solidified hydrocarbons, ash, etc.,) from the exhaust. For example, the upstream particulate filter 168 may receive exhaust (e.g., from the first oxidation catalyst member 158, from the intake chamber 108, etc.) having a first concentration of the first particulates and may provide the exhaust downstream having a second concentration of the first particulates, where the second concentration is lower than the first concentration. In this way, the upstream particulate filter 168 may facilitate reduction of a particulate number (PN) of the exhaust. Decreasing the PN of the exhaust may be desirable in a variety of applications. For example, emissions regulations may prescribe a maximum PN for exhaust emitted to atmosphere and the upstream particulate filter 168 may ensure that the PN of the exhaust emitted to atmosphere by the aftertreatment system 100 is below the maximum PN.

In some embodiments, the upstream particulate filter 168 is a catalyzed DPF. The catalyzed DPF is a filter that has a catalyst coating. The catalyst coating is configured to react with a component of the exhaust to reduce undesirable components in the exhaust. For example, the catalyst coating could be an oxidation catalyst to reduce hydrocarbons within the exhaust. In some embodiments, the catalyst coating is a SCR catalyst configured to reduce $NO_x$ emissions.

The aftertreatment system 100 also includes a mixer 170 (e.g., swirl generating device, etc.). The mixer 170 is positioned downstream of the upstream particulate filter assembly 164 (i.e., the mixer 170 is positioned downstream of the upstream particulate filter 168) and configured to receive exhaust from the upstream particulate filter assembly 164. The mixer 170 may be coupled to the upstream particulate filter housing 166. In some embodiments, the mixer 170 is integrally formed with the upstream particulate filter housing 166. In some embodiments, the mixer 170 is positioned upstream of the first oxidation catalyst member 158.

The reductant fluid delivery system 110 includes a dosing module 172. The dosing module 172 is configured to facilitate passage of the reductant fluid through the mixer 170 and into the mixer 170. In some embodiments, the dosing module 172 is positioned within a dosing module mount. The dosing module mount is configured to facilitate mounting of the dosing module 172 to the mixer 170. The dosing module mount may provide insulation (e.g., thermal insulation, vibrational insulation, etc.) between the dosing module 172 and the decomposition chamber.

The dosing module 172 includes at least one injector 174 (e.g., insertion device, etc.). The injector 174 is configured to receive the reductant fluid from the reductant fluid pump 116. The injector 174 is configured to dose the reductant fluid received by the dosing module 172 into the exhaust within the mixer 170. In some embodiments, the injector 174 is centered on an injection axis 175. The injection axis 175 intersects with and is orthogonal to the conduit axis 106. In some embodiments, the injection axis 175 intersects with the conduit axis 106 and extends at an angle away from the conduit axis 106.

In some embodiments, the dosing module 172 is configured to receive air from the air pump 122. In some applications, the dosing module 172 is configured to mix the air and the reductant fluid into an air-reductant fluid mixture and to provide the air-reductant fluid mixture to the injector 174 (e.g., for dosing into the exhaust within the mixer 170, etc.). Specifically, the injector 174 is configured to receive the air from the air pump 122. The intake chamber dosing module injector 120 is configured to dose the air into the exhaust within the mixer 170.

In various embodiments, the dosing module 172 is configured to receive air and fluid, and doses the reductant fluid into the mixer 170. In various embodiments, the dosing module 172 is configured to receive reductant fluid (and does not receive air), and doses the reductant fluid into the mixer 170. In various embodiments, the dosing module 172 is configured to receive reductant fluid, and doses the reductant fluid into the mixer 170. In various embodiments, the dosing module 172 is configured to receive air and reductant fluid, and doses the reductant fluid into the mixer 170.

In some embodiments, the aftertreatment system 100 includes a second oxidation catalyst member (e.g., second diesel oxidation catalyst (DOC), etc.). The second oxidation catalyst is positioned downstream of the mixer 170. The second oxidation catalyst is substantially similar to the first oxidation catalyst and therefore is not described in further detail.

The aftertreatment system 100 includes a first downstream catalyst member 176 (e.g., conversion catalyst member, SCR catalyst member, catalytic metals, etc.). The first downstream catalyst member 176 is positioned downstream of the mixer 170. In some embodiments, the first downstream catalyst member 176 is downstream of the second oxidation catalyst. The first downstream catalyst member 176 is configured to cause decomposition of components of the exhaust using the reductant fluid (e.g., via catalytic reactions, etc.). The first downstream catalyst member 176 includes a first downstream catalyst housing 178 and a first downstream catalyst substrate 180. The first downstream catalyst housing 178 may be coupled to the mixer 170. In some embodiments, the first downstream catalyst housing 178 is integrally formed with the mixer 170. The first downstream catalyst substrate 180 is coupled to the first downstream catalyst housing 178. In some embodiments, the first downstream catalyst substrate 180 is integrally formed with the first downstream catalyst housing 178.

The first downstream catalyst member 176 receives the exhaust from the mixer 170. The exhaust flows through the first downstream catalyst substrate 180 and reacts with the first downstream catalyst substrate 180 so as to cause the exhaust to undergo the processes of evaporation, thermolysis, and/or hydrolysis to form non-$NO_x$ emissions within the introduction conduit 109 and/or the first downstream catalyst member 176. In some embodiments, the exhaust and the reductant fluid within the exhaust react with the first downstream catalyst substrate 180. In this way the first downstream catalyst member 176 is configured to assist the reduction of $NO_x$ emissions by accelerating a $NO_x$ reduction process between the reductant and the $NO_x$ of the exhaust into diatomic nitrogen, water, and/or carbon dioxide and also configured to assist in the reduction of particulates from the exhaust. The first downstream catalyst member 176 may include iron zeolite. The first downstream catalyst member 176 may include copper zeolite. In some embodiments, the aftertreatment system 100 does not include a first downstream catalyst member 176.

The aftertreatment system 100 also includes a second downstream catalyst member 182 (e.g., conversion catalyst member, SCR catalyst member, catalytic metals, etc.). The second downstream catalyst member 182 is positioned downstream of the mixer 170. The second downstream catalyst member 182 is configured to cause decomposition of components of the exhaust using the reductant fluid (e.g., via catalytic reactions, etc.). The second downstream catalyst member 182 includes a second downstream catalyst housing 184. In some embodiments, the second downstream catalyst housing 184 is integrally formed with the first downstream catalyst housing 178. In some embodiments, the second downstream catalyst housing 184 is the first downstream catalyst housing 178. The second downstream catalyst member 182 includes a second downstream catalyst substrate 186. The second downstream catalyst substrate 186 is coupled to the second downstream catalyst housing 184. In some embodiments, the second downstream catalyst substrate 186 is integrally formed with the second downstream catalyst housing 184.

The second downstream catalyst member 182 receives the exhaust from the first downstream catalyst member 176. The exhaust flows through the second downstream catalyst substrate 186 and reacts with the second downstream catalyst substrate 186 so as to cause the exhaust to undergo the processes of evaporation, thermolysis, and/or hydrolysis to form non-$NO_x$ emissions within the introduction conduit 109 and/or the second downstream catalyst member 182. In some embodiments, the exhaust and the reductant fluid within the exhaust react with the second downstream catalyst substrate 186. In this way, the second downstream catalyst member 182 is configured to assist the reduction of $NO_x$ emissions by accelerating a $NO_x$ reduction process between the reductant and the $NO_x$ of the exhaust into diatomic nitrogen, water, and/or carbon dioxide, and also configured to assist in the reduction of particulates from the exhaust. The second downstream catalyst member 182 may include iron zeolite. The second downstream catalyst member 182 may include copper zeolite. In some embodiments, the aftertreatment system 100 does not include a second downstream catalyst member 182.

The aftertreatment system 100 includes a downstream ammonia slip catalyst substrate 188. The downstream ammonia slip catalyst substrate 188 is positioned downstream of the second downstream catalyst member 182. In some embodiments, the downstream ammonia slip catalyst substrate 188 is a coating applied to a portion of the outlet of the first downstream catalyst member 176. The downstream ammonia slip catalyst substrate 188 may be a coating applied to a portion of the outlet of the second downstream catalyst member 182. The downstream ammonia slip catalyst substrate 188 is configured to receive the exhaust from the second downstream catalyst member 182 and assist in the reduction of the byproducts (e.g., ammonia, etc.) of the processes of the dosing module 172 and the second downstream catalyst member 182. In some embodiments, the downstream ammonia slip catalyst substrate 188 is positioned downstream of the first downstream catalyst member 176 and is configured to receive the exhaust from the first downstream catalyst member 176 and assist in the reduction of the byproducts (e.g., ammonia, etc.) of the processes of the dosing module 172 and the first downstream catalyst member 176. Specifically, the dosing module 172 may introduce ammonia into the exhaust, however a portion of the ammonia introduced may not react with the exhaust. As a result, excess ammonia may slip from the first downstream catalyst member 176 and/or the second downstream catalyst member 182 into the exhaust downstream of the first downstream catalyst member 176 and/or the second downstream catalyst member 182 such that the exhaust downstream of the downstream ammonia slip catalyst substrate 188 does not contain an undesirable amount of ammonia. In some embodiments, the aftertreatment system 100 does not include the downstream ammonia slip catalyst substrate 188.

The aftertreatment system 100 also includes an outlet chamber 190. The outlet chamber 190 is positioned downstream of the downstream ammonia slip catalyst substrate 188 and is configured to receive the exhaust from downstream ammonia slip catalyst substrate 188. In various embodiments, the outlet chamber 190 is coupled to the downstream ammonia slip catalyst substrate 188. For example, the outlet chamber 190 may be fastened, welded, riveted, or otherwise attached to the downstream ammonia slip catalyst substrate 188. In some embodiments, the outlet chamber 190 is coupled to the introduction conduit 109. In some embodiments, the outlet chamber 190 is the introduction conduit 109 (e.g., only the introduction conduit is included in the exhaust conduit system 104 and the introduction conduit 109 functions as both the introduction conduit 109 and the outlet chamber 190). The outlet chamber 190 is centered on the conduit axis 106 (e.g., the conduit axis 106 extends through a center point of the outlet chamber 190, etc.).

In various embodiments, the exhaust conduit system 104 only includes a single conduit that functions as the intake chamber 108, the introduction conduit 109, and the outlet chamber 190.

In various embodiments, the aftertreatment system 100 also includes a first sensor 192 (e.g., $NO_x$ sensor, CO sensor, $CO_2$ sensor, $O_2$ sensor, particulate sensor, nitrogen sensor, etc.). The first sensor 192 is positioned downstream of the downstream ammonia slip catalyst substrate 188. In some embodiments, the first sensor 192 is coupled to the outlet chamber 190. The first sensor 192 is configured to measure (e.g., sense, detect, etc.) a parameter (e.g., $NO_x$ concentration, CO concentration, $CO_2$ concentration, $O_2$ concentration, particulate concentration, nitrogen concentration, sulfur oxide concentration ($SO_x$), etc.) of the exhaust and the reductant fluid downstream of the downstream ammonia slip catalyst substrate 188. The first sensor 192 may be configured to measure the parameter within the outlet chamber 190. In some embodiments, the parameter measured by the first sensor 192 is the particulate concentration in the exhaust downstream of the downstream ammonia slip catalyst substrate 188. In some embodiments, the parameter measured by the first sensor 192 is the $SO_x$ concentration of the exhaust within the outlet chamber 190. In some embodiments, the first sensor 192 measures both the particulate concentration and the $SO_x$ concentration.

The first sensor 192 is electrically or communicatively coupled to the aftertreatment system controller 128 and is configured to provide a first signal associated with the parameter to the aftertreatment system controller 128. The aftertreatment system controller 128 (e.g., via the aftertreatment system processing circuit 130, etc.) is configured to determine a first measurement based on the first signal. The aftertreatment system controller 128 may be configured to control the intake chamber dosing module 112, the dosing module 172, the reductant fluid pump 116, and/or the air pump 122 based on the first signal. Furthermore, the aftertreatment system controller 128 may be configured to communicate the first signal to the central controller 136.

In various embodiments, the aftertreatment system 100 also includes a second sensor 194 (e.g., $NO_x$ sensor, CO sensor, $CO_2$ sensor, $O_2$ sensor, particulate sensor, nitrogen sensor, etc.). The second sensor 194 is positioned downstream of the downstream ammonia slip catalyst substrate 188. In some embodiments, the second sensor 194 is coupled to the outlet chamber 190 and positioned downstream of the first sensor 192. The second sensor 194 is configured to measure (e.g., sense, detect, etc.) a parameter (e.g., $NO_x$ concentration, CO concentration, $CO_2$ concentration, $O_2$ concentration, particulate concentration, nitrogen concentration, $SO_x$ etc.) of the exhaust and the reductant fluid downstream of the downstream ammonia slip catalyst substrate 188. The second sensor 194 may be configured to measure the parameter of the exhaust within the outlet chamber 190. In some embodiments, the parameter measured by the second sensor 194 is the particulate concentration in the exhaust downstream of the downstream ammonia slip catalyst substrate 188. In some embodiments, the parameter measured by the second sensor 194 is the $SO_x$ concentration of the exhaust downstream of the downstream ammonia slip catalyst substrate 188. In some embodiments, the second sensor 194 measures both the particulate concentration and the $SO_x$ concentration.

The second sensor 194 is electrically or communicatively coupled to the aftertreatment system controller 128 and is configured to provide a second signal associated with the parameter to the aftertreatment system controller 128. The aftertreatment system controller 128 (e.g., via the aftertreatment system processing circuit 130, etc.) is configured to determine a second measurement based on the second signal. The aftertreatment system controller 128 may be configured to control the intake chamber dosing module 112, the dosing module 172, the reductant fluid pump 116, and/or the air pump 122 based on the second signal. Furthermore, the aftertreatment system controller 128 may be configured to communicate the second signal to the central controller 136.

In various embodiments, the aftertreatment system 100 also includes a third sensor 196 (e.g., $NO_x$ sensor, CO sensor, $CO_2$ sensor, $O_2$ sensor, particulate sensor, nitrogen sensor, etc.). The third sensor 196 is positioned upstream of the upstream particulate filter 168. In some embodiments, the third sensor 196 is coupled to the intake chamber 108. The third sensor 196 is configured to measure (e.g., sense, detect, etc.) a parameter (e.g., $NO_x$ concentration, CO concentration, $CO_2$ concentration, $O_2$ concentration, particulate concentration, nitrogen concentration, $SO_x$ etc.) of the exhaust and the reductant fluid upstream of the upstream particulate filter 168. The third sensor 196 may be configured to measure a parameter of the exhaust within the intake chamber 108. In some embodiments, the parameter measured by the first sensor 192 is the particulate concentration in the exhaust upstream of the upstream particulate filter 168. In some embodiments, the parameter measured by the third sensor 196 is the $SO_x$ concentration of the exhaust upstream of the upstream particulate filter 168. In some embodiments, the third sensor 196 measures both the particulate concentration and the $SO_x$ concentration.

The third sensor 196 is electrically or communicatively coupled to the aftertreatment system controller 128 and is configured to provide a third signal associated with the parameter to the aftertreatment system controller 128. The aftertreatment system controller 128 (e.g., via the aftertreatment system processing circuit 130, etc.) is configured to determine a third measurement based on the third signal. The aftertreatment system controller 128 may be configured to control the intake chamber dosing module 112, the dosing module 172, the reductant fluid pump 116, and/or the air pump 122 based on the third signal. Furthermore, the aftertreatment system controller 128 may be configured to communicate the third signal to the central controller 136.

III. Overview of the Mixer

Referring to FIG. 4-16, the mixer 200 (e.g., hydrocarbon decomposition chamber 146, mixer 170, etc.), of the aftertreatment system 100 is shown. The mixer 200 is configured to receive exhaust via the introduction conduit 109. The mixer 200 also receives the hydrocarbon fluid from the injector 174. The mixer 200 is configured to mix the hydrocarbon fluid with the exhaust. The mixer 200 is also configured to facilitate swirling (e.g., rotation, etc.) of the exhaust and mixing (e.g., combination, etc.) of the exhaust and the hydrocarbon fluid so as to disperse the hydrocarbon fluid within the exhaust downstream of the mixer (e.g., to increase the ability of the hydrocarbons to heat the gas, etc.). By dispersing the hydrocarbon fluid within the exhaust using the mixer 200, reduction of emission of undesirable components in the exhaust is enhanced and/or an ability of the aftertreatment system 100 to increase a temperature of the exhaust may be enhanced.

The mixer 200 includes a mixer body 202 (e.g., shell, frame, etc.). The mixer body 202 is supported within the introduction conduit 109. The mixer body 202 is centered on a mixer body center axis 204. In some embodiments, the mixer body center axis 204 is the same as the conduit axis 106. In other embodiments, the mixer body center axis 204 is separated from the conduit axis 106. For example, the mixer body center axis 204 may be parallel to the conduit axis 106 and offset from the conduit axis 106. The mixer body 202 is bisected by a mixer body first plane 206 (e.g., mixer body plane, etc.). The mixer body first plane 206 intersects and is orthogonal to the mixer body center axis 204. In some embodiments, the mixer body first plane 206 intersects and is orthogonal to the conduit axis 106. The mixer body is bisected by a mixer body second plane 208. The mixer body second plane 208 intersects and is orthogonal to the mixer body center axis 204 and the mixer body first plane 206. In some embodiments, the mixer body second plane 208 intersects and is orthogonal to the conduit axis 106.

The mixer body 202 include an inlet-side 210. The inlet-side 210 is positioned adjacent to the upstream particulate filter 168. The inlet-side 210 has a diameter approximately in the range of 190 millimeter (mm) to 255 mm (e.g., 180.5 mm, 190 mm, 196.91 mm, 200 mm, 210 mm, 216.29 mm, 220 mm, 230 mm, 240 mm, 250 mm, 254.23 mm 255 mm, 267.75 mm, etc.). The mixer body 202 includes an outlet-side 212. The outlet-side 212 is positioned adjacent to the first downstream catalyst member 176. The outlet-side 212 has a diameter approximately in a range of 230 mm to 330 mm (e.g., 218.5 mm, 230 mm, 235.49 mm, 240 mm, 250 mm, 264 mm, 261.60 mm 270 mm, 272.87 mm, 280 mm, 290 mm, 300 mm, 310 mm, 315 mm, 315.92 mm, 320 mm, 330 mm, 346.5 mm, etc.). The mixer body 202 has a mixer body length ML measured from the inlet-side 210 to the outlet-side 212 approximately in a range between 120 mm to 180 mm (e.g., 114 mm, 120 mm, 125 mm, 130 mm, 133.38 mm, 135 mm, 140 mm, 145 mm, 150 mm, 155 mm, 160 mm, 163.38 mm, 165 mm, 200 mm, 175 mm, 180 mm, 189 mm, etc.).

Figure 4:
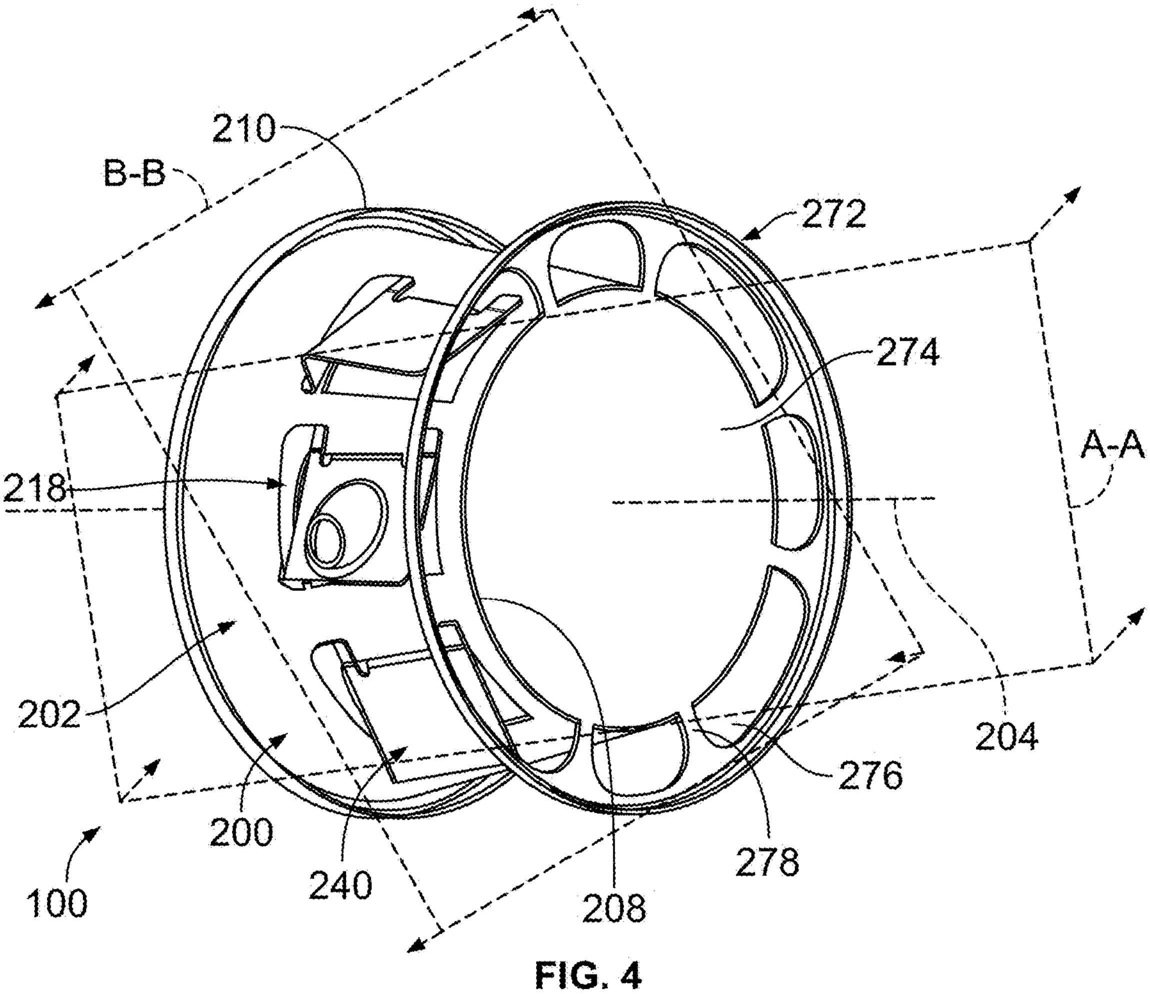
FIG. 4 is a perspective view of a portion of the exhaust aftertreatment system of FIG. 1.
Figure 5:
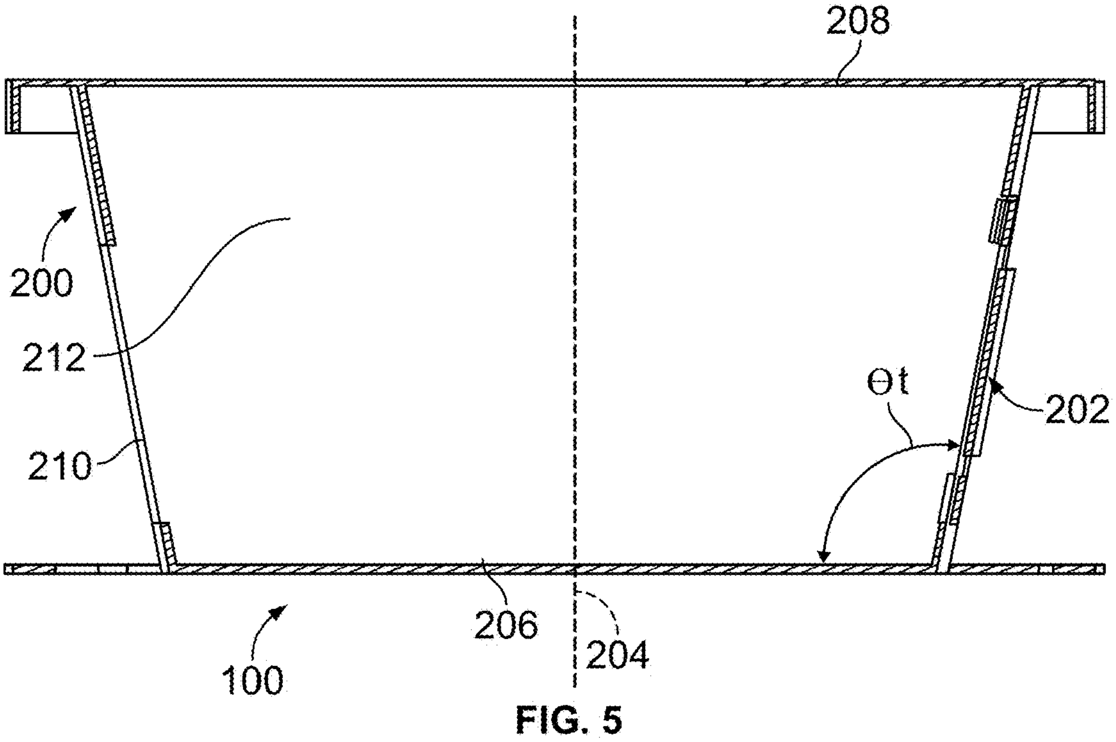
FIG. 5 is a cross-sectional view of a portion of the exhaust aftertreatment system of FIG. 4 taken along a plane A-A.
Figure 6:
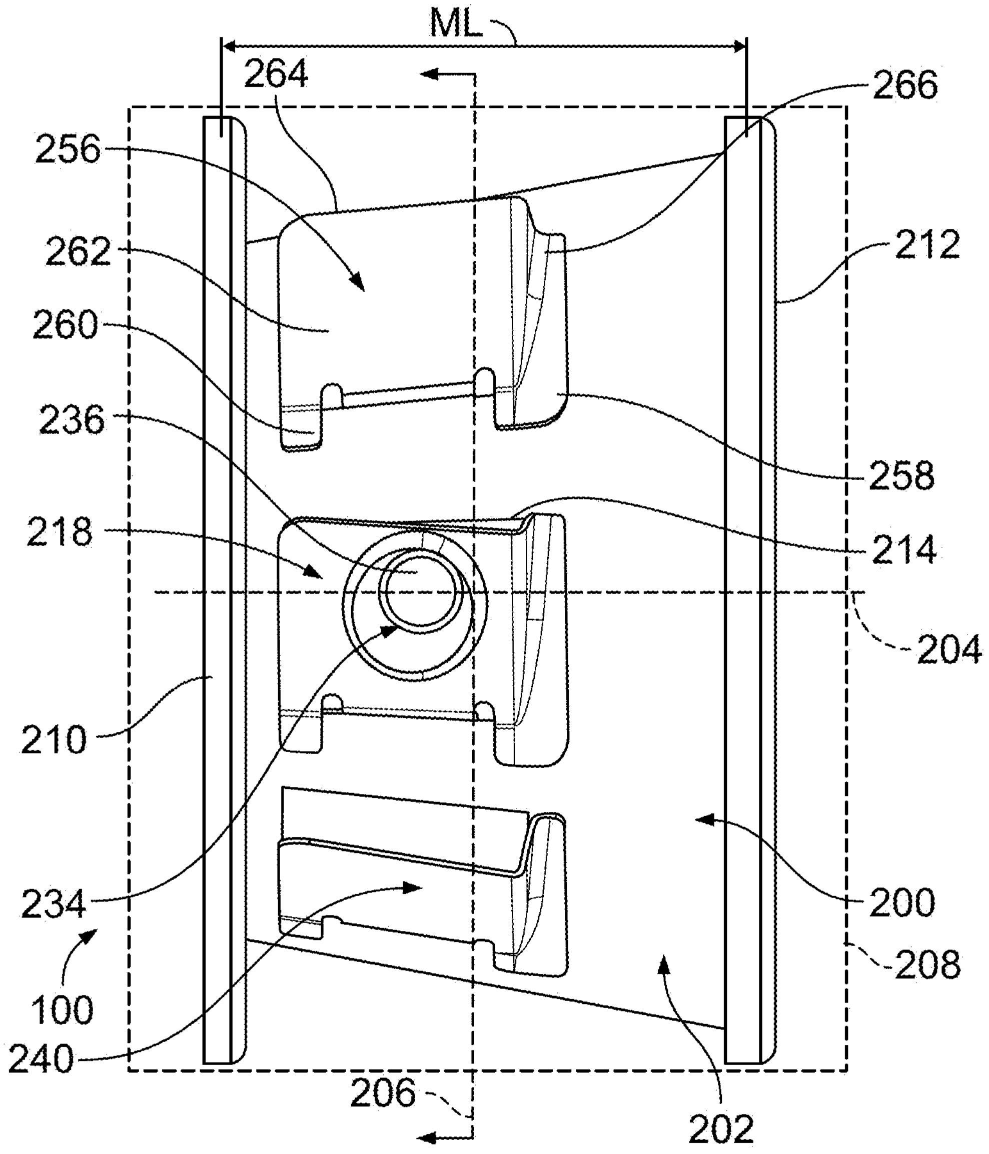
FIG. 6 is a top view of a portion of the exhaust aftertreatment system of FIG. 4.
Figure 7:
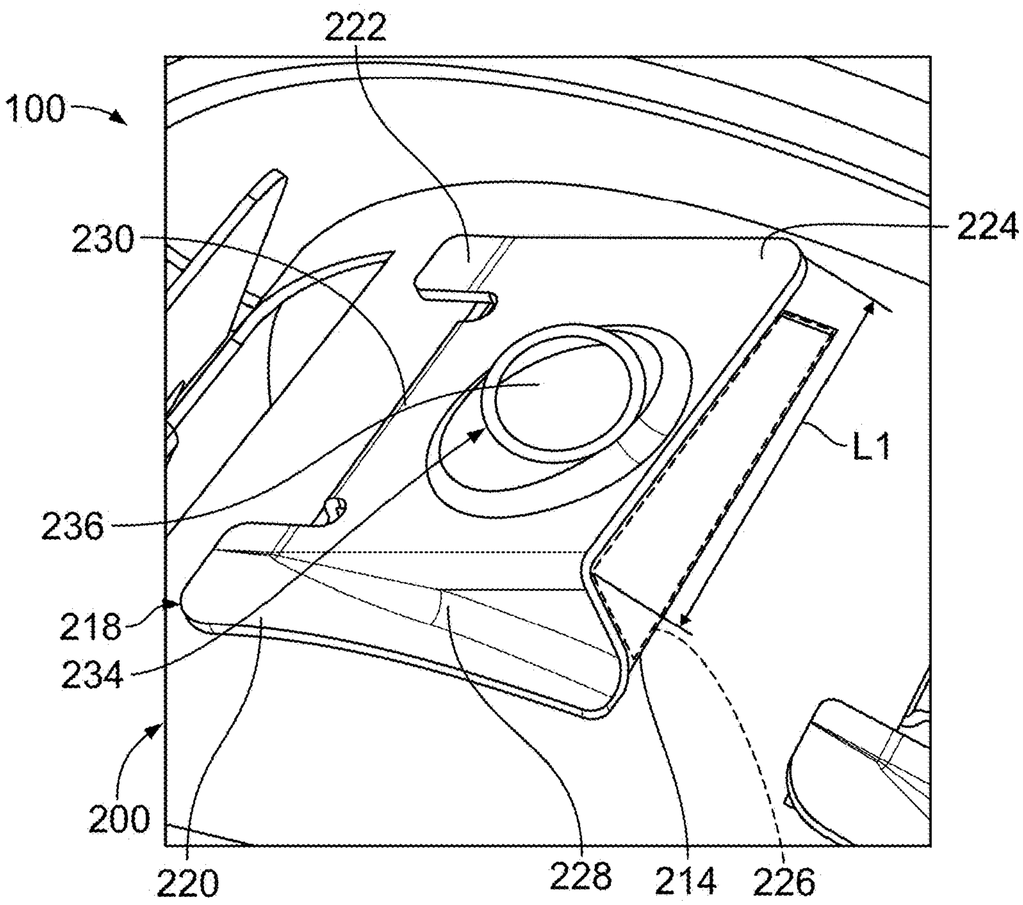
FIG. 7 is a perspective view of a portion of the exhaust aftertreatment system of FIG. 4.
Figure 8:
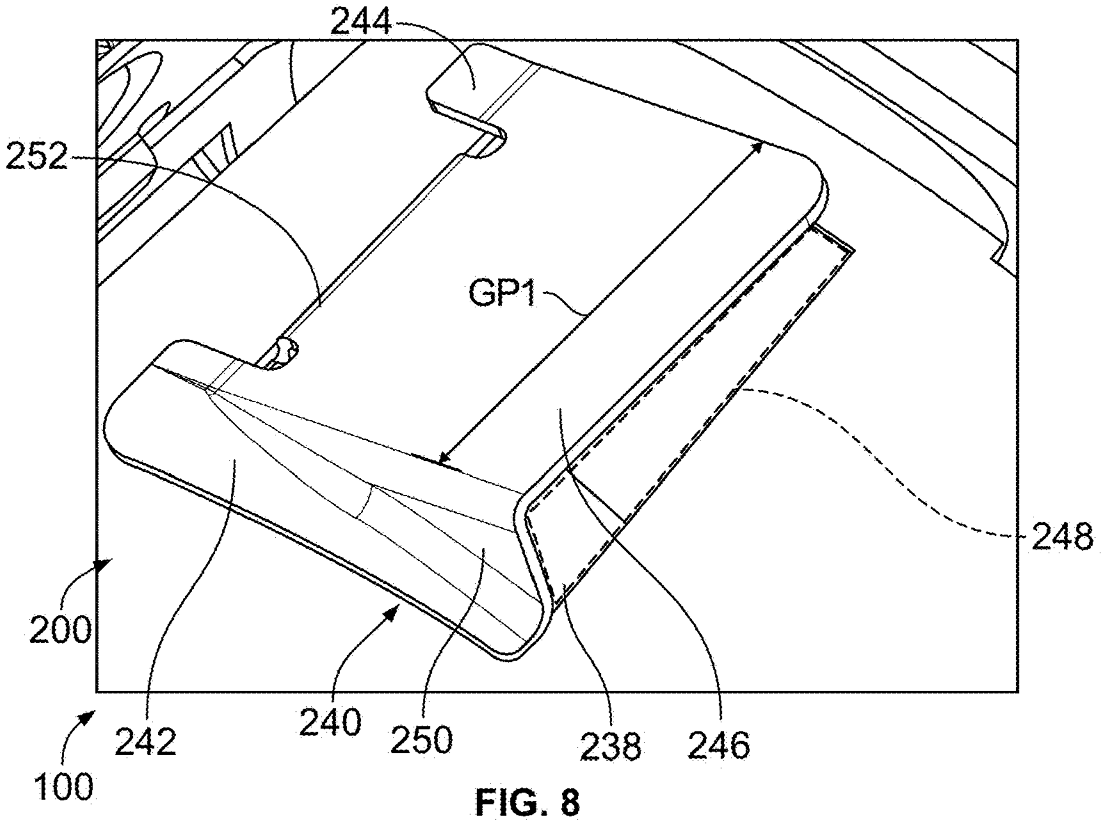
FIG. 8 is a perspective view of another portion of the exhaust aftertreatment system of FIG. 4.
Figure 9:
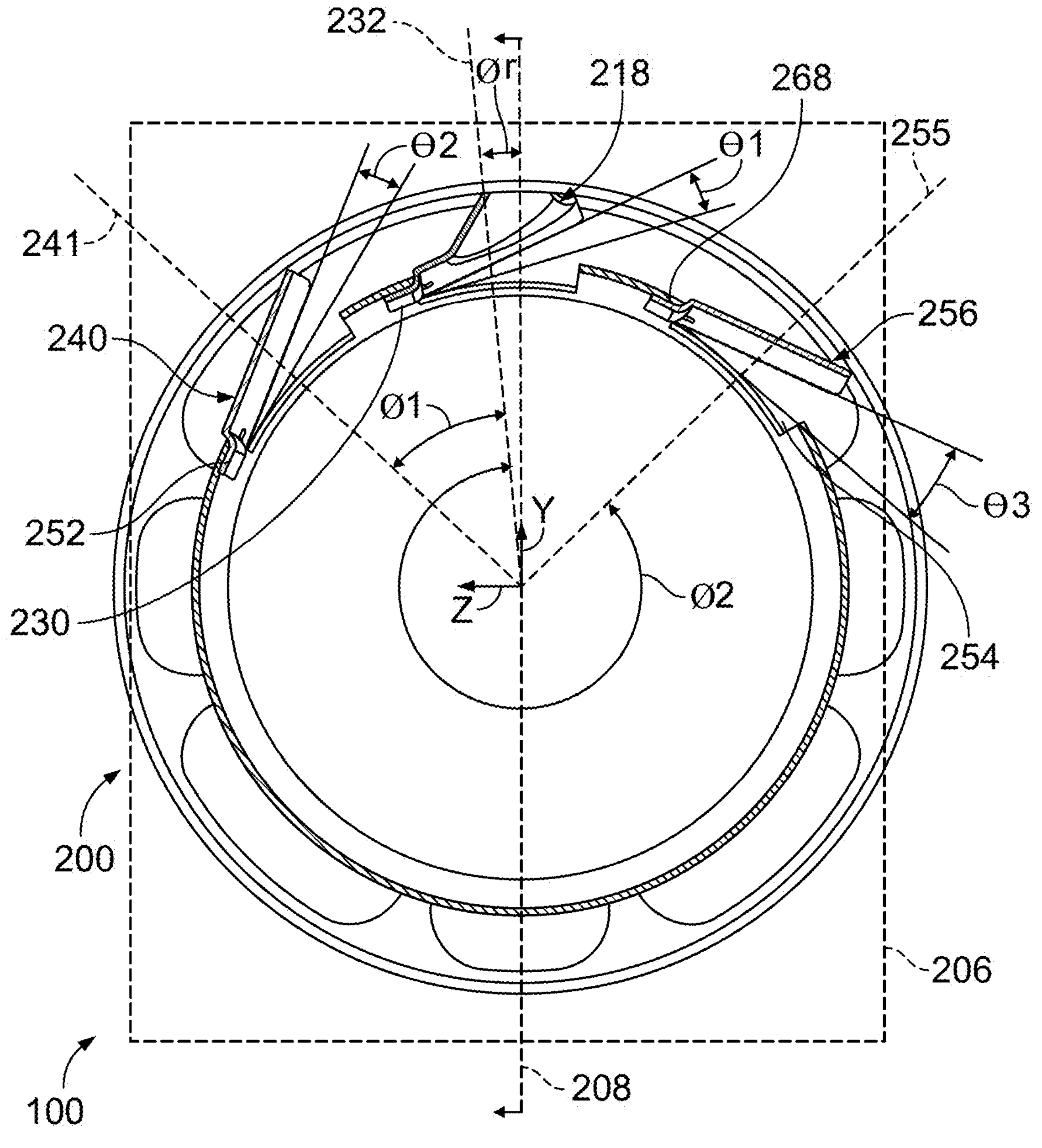
FIG. 9 is a cross-sectional rear view of the portion of the exhaust aftertreatment system of FIG. 4 taken along plane B-B.

As shown in FIG. 5, a cross-sectional view of a portion of the exhaust aftertreatment system of FIG. 4 taken along a plane A-A, the mixer body 202 may be tapered. In some embodiments, the mixer body 202 extends from the inlet-side 210 to the outlet-side 212 at an angle, θt, approximately in a range of 91 degrees (°) to 102° (e.g., 91°, 93°, 95°, 97°, 99°, 99.6°, 100.6°, 101°, 102°, etc.). The mixer body 202 extends from the inlet-side 210 to the outlet-side 212 such that the height of the mixer body is approximately in a range of 120 mm to 165 mm (e.g., 114 mm, 120 mm, 130 mm, 140 mm, 150 mm, 160 mm, 165 mm 173.25 mm, etc.).

The mixer body 202 includes a first aperture 214. The first aperture 214 extends through the mixer body 202. The first aperture 214 may have length along the mixer body 202 measured from the inlet-side 210 to the outlet-side 212 approximately in the range of 70 mm to 100 mm (e.g., 66.5 mm, 70 mm, 75 mm, 76.71 mm, 80 mm, 85 mm, 90 mm, 95 mm, 100 mm, 105 mm, etc.). In some embodiments, the first aperture 214 may have a width measured orthogonally from the length of the first aperture 214 approximately in a range of 70 mm to 100 mm (e.g., 66.5 mm, 70 mm, 75 mm, 80 mm, 85 mm, 90 mm, 99.01 mm, 95 mm, 100 mm, 105 mm, etc.). The first aperture 214 is configured to facilitate flow of the exhaust from the outer portion of the mixer body 202 through the mixer body 202 and into a mixer body cavity 216 (e.g., void, etc.). The mixer body cavity 216 receives the exhaust from the first aperture 214. As is explained in more detail herein, the exhaust is caused to swirl within the mixer body 202, and this swirling facilitates mixing of the exhaust and the hydrocarbon fluid.

The mixer 200 includes an injector plate 218. The injector plate 218 is coupled to the mixer body along a portion of the first aperture 214. The injector plate 218 is configured to facilitate flow of the exhaust from the outer portion of the mixer body 202 through the first aperture. The injector plate 218 may have a length, L1, approximately in a range of 70 mm to 100 mm (e.g., 66.5 mm, 70 mm, 75 mm, 80 mm, 85 mm, 90 mm, 99.01 mm, 95 mm, 100 mm, 105 mm, etc.). The injector plate 218 includes an injector plate first flange 220. The injector plate first flange 220 is configured to couple a portion of the injector plate 218 to the mixer body 202. The injector plate 218 includes injector plate second flange 222. The injector plate second flange 222 is configured to couple a portion of the injector plate 218 to the mixer body 202 opposite of the portion of the injector plate 218 coupled by the injector plate first flange 220.

The injector plate 218 includes an injector plate panel 224. The injector plate panel 224 is contiguous with the injector plate second flange 222. The panel of the injector plate 218 is positioned such that the injector plate 218 is angled away from the mixer body at a first opening angle, θ1, approximately in a range of 15° to 30° (e.g., 15°, 20°, 20.5°, 25°, 30°, etc.,) measured counter clockwise from the mixer body 202 to form a flow aperture 226. As used herein, angles are measured positive in a counter clockwise direction from the outlet-side 212 looking upstream toward the inlet-side 210. The flow aperture 226 is formed between a first edge of the injector plate panel 224 and the mixer body 202 and between a second edge of the injector plate panel 224 and the mixer body 202. The flow aperture 226 is configured to facilitate flow of exhaust between the mixer body 202 and the injector plate panel 224 such that the exhaust flows through the first aperture 214 and into the mixer body cavity 216.

The injector plate 218 includes an injector plate sidewall 228 (e.g., injector plate side, etc.). The injector plate sidewall 228 is contiguous with the injector plate first flange 220 and the injector plate panel 224. The injector plate sidewall 228 is configured to prevent the flow of exhaust between the injector plate panel 224 and the injector plate first flange 220. In some embodiments, the injector plate sidewall 228 is configured to guide a portion of the exhaust flowing between the injector plate panel 224 and the mixer body 202 through the first aperture 214. For example, as the exhaust flows downstream toward the injector plate 218, a portion of the exhaust flows through the flow aperture 226 and a portion of the portion of the exhaust makes contact with the injector plate sidewall 228 and is directed toward the first aperture 214 and into the mixer body cavity 216. In some embodiments, the injector plate sidewall 228 is rounded to facilitate swirling of the exhaust.

The injector plate 218 includes a tab 230. The tab 230 is positioned within and along a portion of the first aperture 214. The tab 230 is contiguous with the injector plate panel 224 and is configured to prevent (e.g., obstruct, etc.) flow of the exhaust along an edge of the injector plate panel 224. The tab 230 further couples the injector plate 218 to the mixer body 202.

The injector plate 218 is coupled to the mixer body 202 such that a portion of the injector plate 218 is centered on a reference axis 232. The reference axis 232 extends along the mixer body first plane 206. The reference axis 232 is angled at a reference angle Ør away from the mixer body second plane 208 approximately in a range of 2° to 10° (e.g., 2°, 4°, 6°, 8°, 10°, etc.).

The injector plate 218 includes an injector cone 234. The injector cone 234 is positioned on the injector plate. The injector cone 234 includes an injection aperture 236. The injection aperture 236 is configured to facilitate flow of the hydrocarbon fluid from the injector 174 through the injector cone 234 and the injector plate 218 to the mixer body cavity 216. For example, the injector 174 injects hydrocarbon fluid through the injection aperture 236 into the mixer body cavity 216 such that the hydrocarbon fluid and the exhaust may mix. In some embodiments, the injection aperture 236 is centered on the injection axis 175. In some embodiments, the injection axis 175 may be angled away from the center of the injector cone 234.

The mixer 200 incudes a second aperture 238. The second aperture 238 is substantially similar to the first aperture 214 and therefore not described in further detail. The mixer 200 includes a first guide plate 240. The first guide plate 240 is coupled to the mixer body 202 along a portion of the second aperture 238. The first guide plate 240 is configured to facilitate a portion of the exhaust at the outer portion of the mixer body 202 through the second aperture 238 through the mixer body 202 and into the mixer body cavity 216. The first guide plate 240 has a length, GP1, approximately in a range of 70 mm to 100 mm (e.g., 66.5 mm, 70 mm, 75 mm, 80 mm, 80.12 mm, 84.18 mm, 85 mm, 90 mm, 95 mm, 100 mm, 105 mm, etc.). The first guide plate 240 is centered on a first guide plate axis 241 (e.g., guide plate axis, etc.). The first guide plate axis 241 extends along the mixer body first plane 206 and intersects with the conduit axis 106. The first guide plate axis 241 is positioned at a first separation angle Ø1 from the reference axis 232. The first separation angle Ø1 is approximately in a range of 30° to 60° (e.g., 30°, 35°, 40°, 45°, 50°, 55°, 60°, etc.).

The first guide plate 240 includes first guide plate first flange 242. The first guide plate first flange 242 is configured to couple a portion of the first guide plate 240 to the mixer body 202. The first guide plate 240 includes first guide plate second flange 244. The first guide plate second flange 244 is configured to couple a portion of the first guide plate 240 to the mixer body 202 opposite of the portion of the first guide plate 240 coupled by the first guide plate first flange 242.

Figure 10:
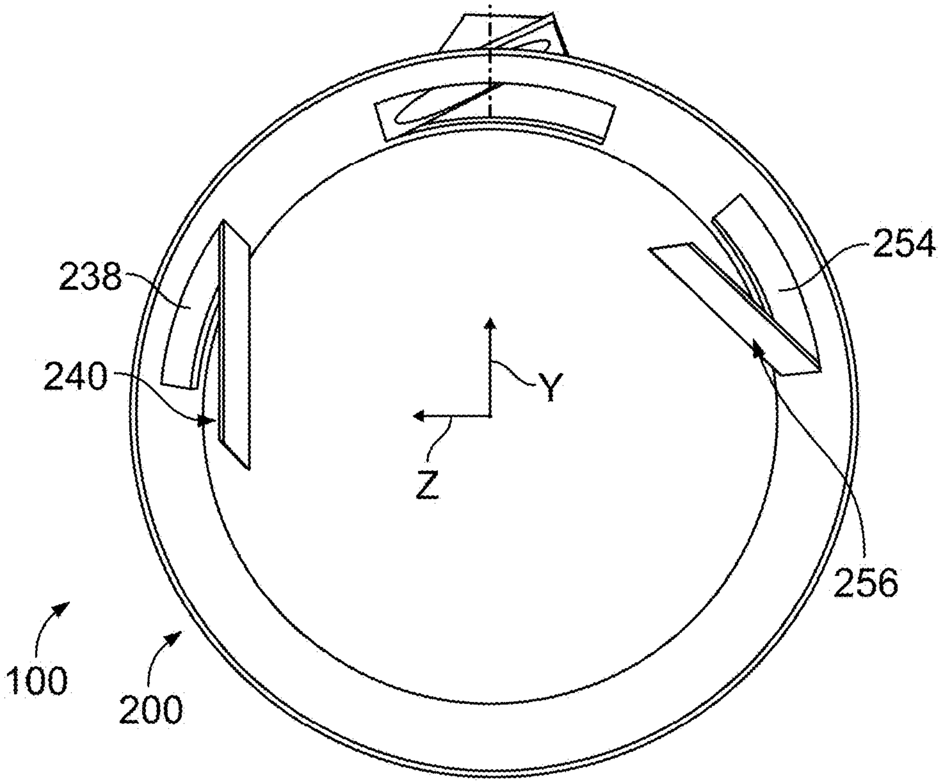
FIG. 10 is a cross-section rear view of another portion of the exhaust aftertreatment system taken along plane B-B, according to one embodiment.

The first guide plate 240 includes a first guide plate panel 246. The first guide plate panel 246 is contiguous with the first guide plate second flange 244. The first guide plate panel 246 is positioned such that the first guide plate 240 is angled away from the mixer body at a second opening angle θ2 approximately in a range of 15° to 30° (e.g., 15°, 20°, 20.5°, 22.1°, 25°, 30°, etc.) to form a first guide plate flow aperture 248. The first guide plate flow aperture 248 is formed between a first edge of the first guide plate panel 246 and the mixer body 202 and between a second edge of the first guide plate panel 246 and the mixer body 202 such that the exhaust flows through the second aperture 238 and into mixer body cavity 216. As shown in FIG. 10, in some embodiments, the first guide plate 240 is angled inward and towards the mixer body center axis 204 such that the first guide plate 240 extends within the mixer body cavity 216.

The first guide plate 240 includes a first guide plate sidewall 250 (e.g., guide plate side, first guide plate side, etc.). The first guide plate sidewall 250 is contiguous with the first guide plate first flange 242 and the first guide plate panel 246. The first guide plate sidewall 250 is configured to prevent the flow of exhaust between the first guide plate panel 246 and the first guide plate first flange 242. In some embodiments, the first guide plate sidewall 250 is configured to guide a portion of the exhaust flowing between the first guide plate panel 246 and the mixer body 202 through the second aperture 238. For example, as the exhaust flows downstream toward the first guide plate 240, a portion of the exhaust flows through the first guide plate flow aperture 248 and a portion of that portion of the exhaust makes contact with the first guide plate sidewall 250 and is directed toward the second aperture 238 and into the mixer body cavity 216. In some embodiments, the first guide plate sidewall 250 is rounded so as to facilitate swirling of the exhaust.

The first guide plate 240 includes a first guide plate tab 252. The first guide plate tab 252 is positioned within and along a portion of the second aperture 238. The first guide plate tab 252 is contiguous with the first guide plate panel 246 and is configured to prevent flow of the exhaust along an edge of the first guide plate panel 246. The first guide plate tab 252 further couples the first guide plate 240 to the mixer body 202.

The mixer 200 includes a third aperture 254. The third aperture is substantially similar to the first aperture 214 and therefore not described in further detail. The mixer 200 includes a second guide plate 256. The second guide plate 256 is substantially similar to the first guide plate 240. The second guide plate 256 is centered on a second guide plate axis 255. The second guide plate axis 255 extends along the mixer body first plane 206 and intersects the conduit axis 106. The second guide plate axis 255 is positioned at a second separation angle Ø2 from the reference axis 232. The second separation angle Ø2 is approximately in the range of 300° to 330° (e.g., 300°, 305°, 310°, 315°, 320°, 325°, 330°, etc.).

The second guide plate 256 includes a second guide plate first flange 258 which is substantially similar to the first guide plate first flange 242 and therefore not described in further detail. The second guide plate 256 includes a second guide plate second flange 260 which is similar to the first guide plate second flange 244 and therefore not described in further detail.

The second guide plate 256 includes a second guide plate panel 262 which is substantially similar to the first guide plate panel 246. The second guide plate panel 262 is positioned such that the second guide plate 256 is angled away from the mixer body at a third opening angle θ3 approximately in a range of 15° to 30° (e.g., 15°, 20°, 20.5°, 22.1°, 25°, 30°, etc.) to form a second guide plate flow aperture 264. The second guide plate flow aperture 264 is substantially similar to the first guide plate flow aperture 248 and therefore not described in further detail. As shown in FIG. 10, in some embodiments, the second guide plate 256 is angled inward and towards the mixer body center axis 204 at an angle from the third aperture 254 such that the second guide plate 256 extends within mixer body cavity 216.

The second guide plate 256 includes a second guide plate sidewall 266 (e.g., second guide plate side, etc.). The second guide plate sidewall 266 is similar to the first guide plate sidewall 250 and therefore not described in further detail. The second guide plate 256 includes a second guide plate tab 268. The second guide plate tab 268 is substantially similar to the first guide plate tab 252 and therefore not described in further detail.

Figure 11:
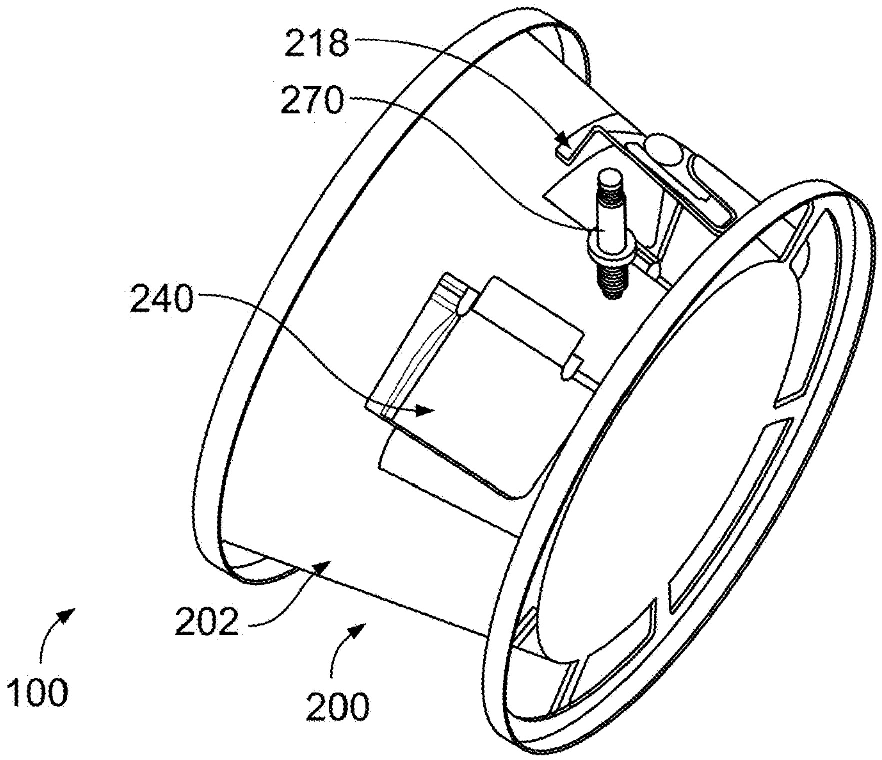
FIG. 11 is a perspective view of the portion of exhaust aftertreatment system of FIG. 4.

As shown in FIG. 11, in some embodiments the mixer 200 includes a fourth sensor 270 (e.g., $NO_x$ sensor, CO sensor, $CO_2$ sensor, $O_2$ sensor, particulate sensor, nitrogen sensor, etc.). The fourth sensor 270 is coupled to the mixer body 202. In some embodiments, the fourth sensor 270 is coupled to the mixer body 202 between the first guide plate 240 and the injector plate 218. In some embodiments, the fourth sensor 270 is coupled to the mixer body 202 between the second guide plate 256 and the injector plate 218. The fourth sensor 270 is configured to measure (e.g., sense, detect, etc.) a parameter (e.g., $NO_x$ concentration, CO concentration, $CO_2$ concentration, $O_2$ concentration, particulate concentration, nitrogen concentration, $SO_x$ etc.) of the exhaust and the hydrocarbon fluid within the mixer body cavity 216. The fourth sensor 270 is electrically or communicatively coupled to the aftertreatment system controller 128 and is configured to provide a fourth signal associated with the parameter to the aftertreatment system controller 128. The aftertreatment system controller 128 (e.g., via the aftertreatment system processing circuit 130, etc.) is configured to determine a fourth measurement based on the fourth signal. The aftertreatment system controller 128 may be configured to control the intake chamber dosing module 112, the dosing module 172, the hydrocarbon fluid pump 154, and/or the air pump 122 based on the fourth signal. Furthermore, the aftertreatment system controller 128 may be configured to communicate the fourth signal to the central controller 136.

Referring back to FIG. 4, the aftertreatment system 100 includes an inlet flange 272 (e.g., panel, coupler, ring, etc.). The inlet flange 272 includes an inlet flange body 274. The inlet flange body 274 is coupled to the mixer body 202. The inlet flange body 274 prevents exhaust from flowing directly into the mixer body cavity 216. In some embodiments, the inlet flange body 274 is also coupled to the introduction conduit 109. The inlet flange 272 functions to separate the mixer body 202 from the introduction conduit 109 and support the mixer body 202 within the introduction conduit 109.

The inlet flange 272 includes a plurality of inlet flange apertures 276 (e.g., windows, holes, etc.). Each of the inlet flange apertures 276 extends through the inlet flange body 274. The inlet flange apertures 276 are arrayed (e.g., arranged, positioned, etc.) circumferentially around the inlet flange body 274. Each of the inlet flange apertures 276 is configured to facilitate passage of the exhaust through the inlet flange body 274 to a passageway. The passageway is positioned between the mixer body 202 and the introduction conduit 109 and configured to receive the exhaust flowing from the inlet flange apertures 276 such that the injector plate 218 facilitates a portion of the exhaust through the first aperture 214, the first guide plate 240 facilitates a portion of the exhaust through the second aperture 238 and the second guide plate facilitates a portion of the exhaust through the third aperture 254.

In various embodiments, such as shown in FIG. 4, the inlet flange 272 includes a plurality of inlet flange supports 278 (e.g., arms, bars, support structures, etc.). The inlet flange supports 278 are coupled to the inlet flange body 274 and are configured to couple the inlet flange 272 to the introduction conduit 109. In some embodiments, the inlet flange supports 278 may be integrally formed with the inlet flange body 274.

Each of the inlet flange supports 278 may define a portion of one of the inlet flange apertures 276. For example, where the inlet flange 272 includes four inlet flange supports 278, the inlet flange includes four inlet flange apertures 276 (e.g., a first inlet flange aperture 276 between a first inlet flange support 278 and a second inlet flange support 278, a second inlet flange aperture 276 between a second inlet flange support 278 and a third inlet flange support 278, a third inlet flange aperture 276 between a third inlet flange support 278 and a fourth inlet flange support 278, and a fourth inlet flange aperture 276 between a fourth inlet flange support 278 and a first inlet flange support 278). In various embodiments, the distance between each of the inlet flange supports 278 may vary. For example, the distance between a first inlet flange support 278 and a second inlet flange support 278 may be greater than the distance between the second inlet flange support 278 and the third inlet flange support 278. Consequently, the size of the first inlet flange aperture 276 is greater than the size of the second inlet flange aperture 276.

In operation, the exhaust flows from an internal engine to the intake chamber 108. The exhaust flows through the upstream components (e.g., the upstream catalyst member 138, the upstream ammonia slip catalyst substrate 144, etc.), as described herein, and through the plurality of inlet flange apertures 276. The exhaust flows toward the injector plate 218, the first guide plate 240, and the second guide plate 256. The injector plate 218 facilitates a portion of the exhaust through the first aperture 214 and into the mixer body cavity 216, as described herein. The first guide plate 240 facilitates a portion of the exhaust through the second aperture 238 and into the mixer body cavity 216, as described herein. The second guide plate 256 facilitates a portion of the exhaust through the third aperture and into the mixer body cavity 216, as described herein. The exhaust is caused to swirl within the mixer body cavity 216 so as to mix with the hydrocarbon fluid. The exhaust flows from the mixer body cavity 216 downstream.

Figure 12:
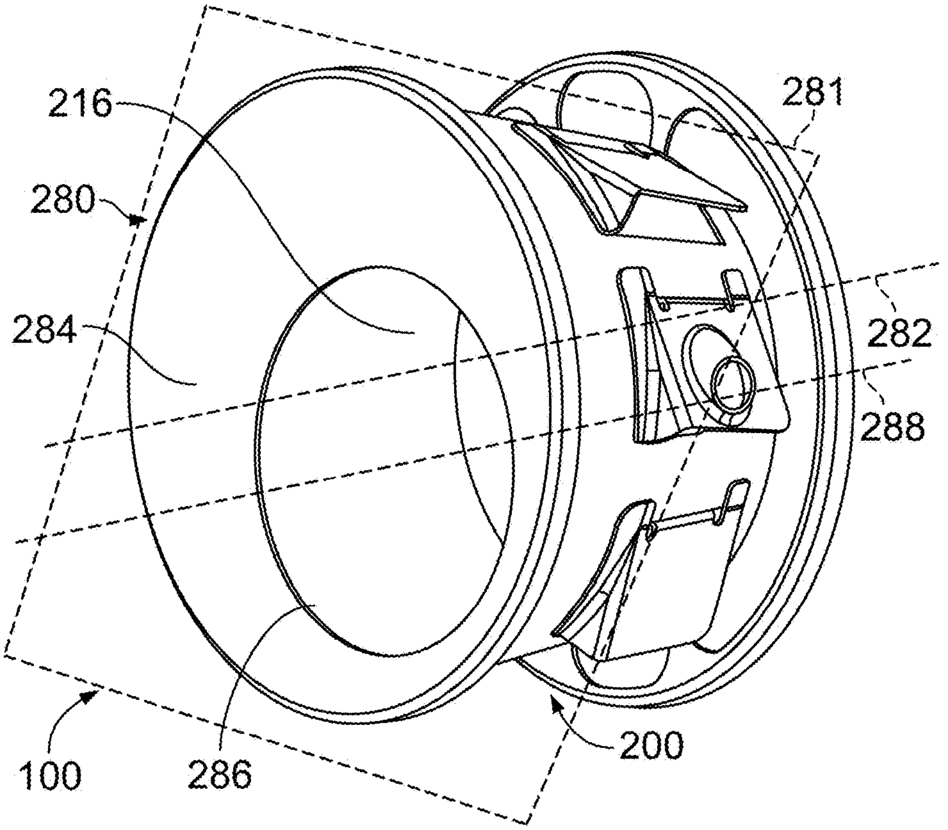
FIG. 12 is a perspective view of the portion of exhaust aftertreatment system of FIG. 4.
Figure 13:
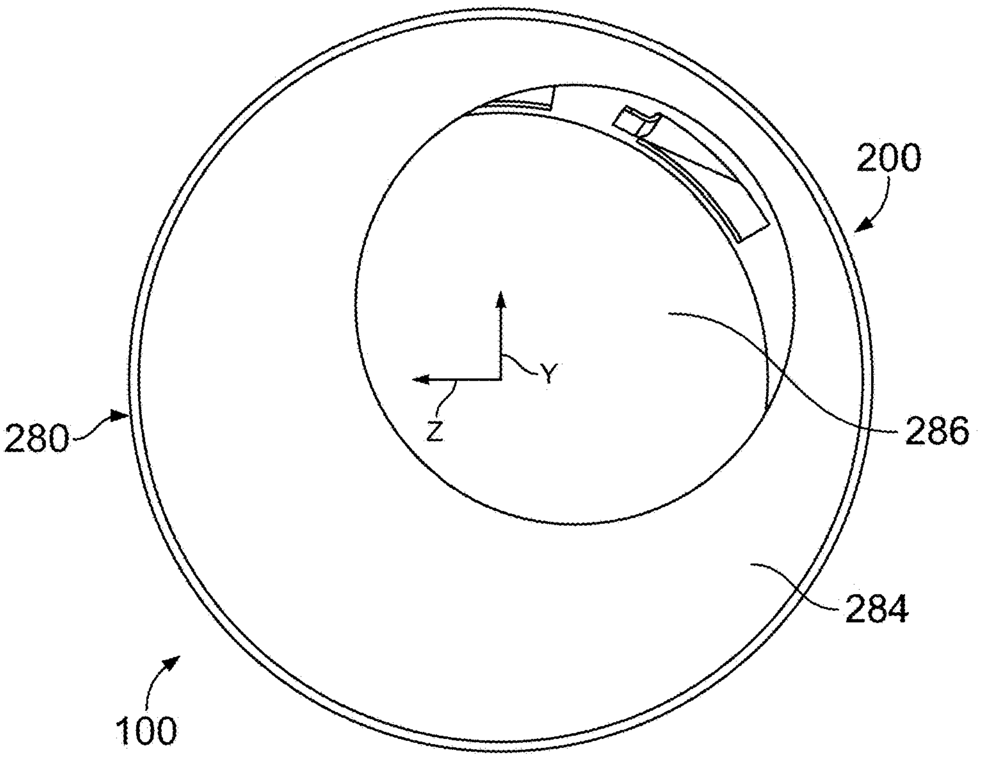
FIG. 13 is a front view of the portion of exhaust aftertreatment system of FIG. 4, according to one embodiment.

Referring to FIGS. 12 and 13, the mixer 200 includes an outlet flange 280. The outlet flange 280 (e.g., panel, coupler, ring, etc.). The outlet flange 280 is coupled to the introduction conduit 109. The outlet flange 280 is bisected by an outlet flange plane 281. The outlet flange 280 is centered on an outlet flange center axis 282. The outlet flange center axis 282 intersects the outlet flange plane 281 and is orthogonal to the outlet flange plane 281. In some embodiments, the outlet flange center axis 282 is the same as the conduit axis 106. The outlet flange 280 includes an outlet flange body 284. The outlet flange body 284 is centered on the outlet flange center axis 282.

The outlet flange 280 include an outlet flange opening 286. The outlet flange opening 286 extends through the outlet flange body 284. The outlet flange opening 286 is configured to provide the exhaust from the mixer body cavity 216 through the outlet flange 280 to downstream components (e.g., the first oxidation catalyst member 158, the upstream particulate filter 168, the mixer 170, the first downstream catalyst member 176, the second downstream catalyst member 182, and the downstream ammonia slip catalyst substrate 188, etc.). The outlet flange opening 286 has a diameter approximately in the range of 145 mm to 215 mm (e.g., 137.75 mm, 145 mm, 150 mm, 155 mm, 160 mm, 165 mm, 200 mm, 171.18 mm, 175 mm, 180 mm, 185 mm, 190 mm, 195 mm, 200 mm, 205 mm, 210 mm, 215 mm, 225.75 mm, etc.).

Figure 14:
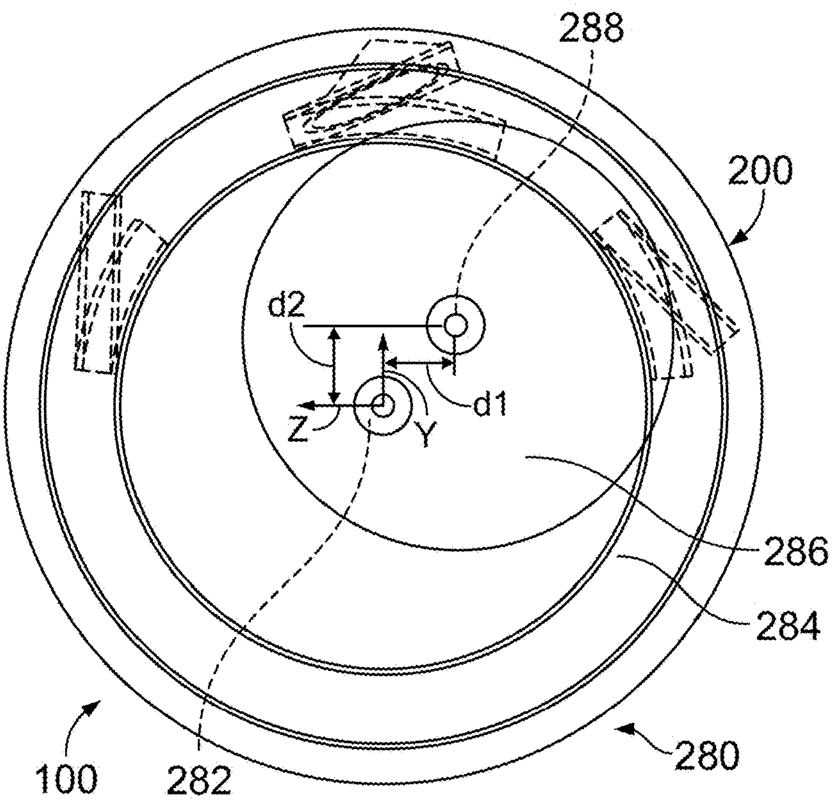
FIG. 14 is a front partial transparency view of the portion of exhaust aftertreatment system of FIG. 4, according to one embodiment.

Referring to FIG. 14, the outlet flange opening center axis 288 is offset from the outlet flange center axis 282 such that the outlet flange opening 286 is offset from the center of the outlet flange 280. The outlet flange opening center axis 288 is offset in a horizontal direction d1 from the outlet flange center axis 282 approximately in a range of 25 mm to 45 mm (e.g., 25 mm, 30 mm, 35 mm, 40 mm, 45 mm, etc.). The outlet flange opening center axis 288 is offset in a vertical direction d2 from the outlet flange center axis 282 approximately in a range of 25 mm to 45 mm (e.g., 25 mm, 30 mm, 35 mm, 40 mm, 45 mm, etc.). By offsetting the outlet flange opening 286 from the center of the outlet flange 280, the pressure of the exhaust flowing from the mixer body cavity 216 is reduced.

Figure 15:
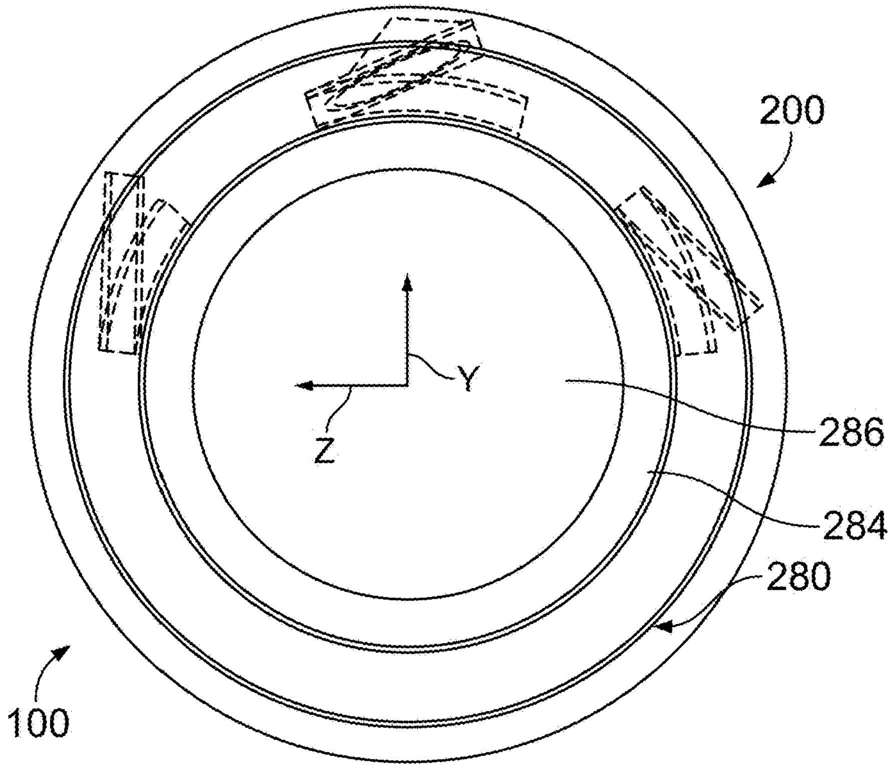
FIG. 15 is a front partial transparency view of the portion of exhaust aftertreatment system of FIG. 4, according to one embodiment.

In some embodiments, the outlet flange opening 286 is centered on an outlet flange opening center axis 288. As shown in FIG. 15, in some embodiments, the outlet flange opening center axis 288 is the same as the outlet flange center axis 282 such that the outlet flange opening 286 is centered on the outlet flange body 284.

Figure 16:
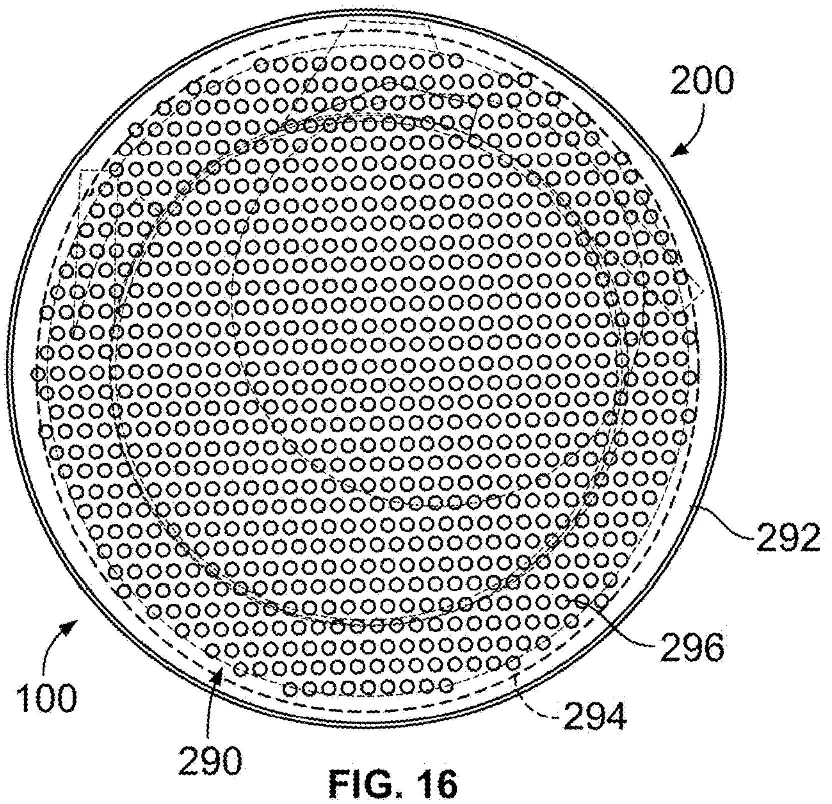
FIG. 16 is a front partial transparency view of a portion of the exhaust aftertreatment system of FIG. 4 from upstream looking downstream.

Referring to FIG. 16, the aftertreatment system 100 includes a perforated dividing plate 290. The perforated dividing plate 290 is positioned downstream of the outlet flange 280 and is coupled to the introduction conduit 109. The perforated dividing plate 290 includes a perforated dividing plate body 292. The perforated dividing plate body 292 is centered on a perforated dividing plate body center axis (not shown).

The perforated dividing plate 290 includes a perforated region 294. The perforated dividing plate 290 includes a plurality of perforated dividing plate perforations 296 that are disposed on the perforated dividing plate body 292 within the perforated region 294.

In some embodiments, the perforated region 294 is configured such that at least three of the perforated dividing plate perforations 296 are truncated (e.g., intersected, etc.) by a boundary (e.g., edge, border, etc.) of the perforated region 294. In other embodiments, the perforated region 294 is configured such that none of the perforated dividing plate perforations 296 are truncated by the boundary of the perforated region 294.

The perforated dividing plate perforations 296 may be arranged uniformly (e.g., with uniform size, with uniform spacing, with uniform size and spacing, etc.) within the perforated region 294, etc.). The perforated dividing plate perforations 296 may be circumferentially arrayed in a grid pattern within the perforated region 294.

The perforated region 294 is positioned on the perforated dividing plate body 292 and centered on perforated dividing plate center axis. The perforated region 294 is defined by a shape (e.g., circle, ellipse, oval, rectangle, etc.). In various embodiments, the perforated region 294 is circular.

The perforated dividing plate perforations 296 extend through the perforated dividing plate body 292. Each of the perforated dividing plate perforations 296 is configured to facilitate passage of the exhaust and hydrocarbon fluid through the perforated dividing plate 290. As the exhaust and the hydrocarbon fluid flow downstream through the outlet flange 280 towards the perforated dividing plate 290, flow of the exhaust and the hydrocarbon fluid is impeded by the perforated dividing plate body 292. As a result of the impedance, the exhaust and the hydrocarbon fluid are redirected towards the plurality of perforated dividing plate perforations 296. The exhaust and the hydrocarbon fluid then flow through the perforated dividing plate perforations 296 which generates further mixing of the exhaust and the hydrocarbon fluid to assist with the regeneration of downstream components.

Figure 17:
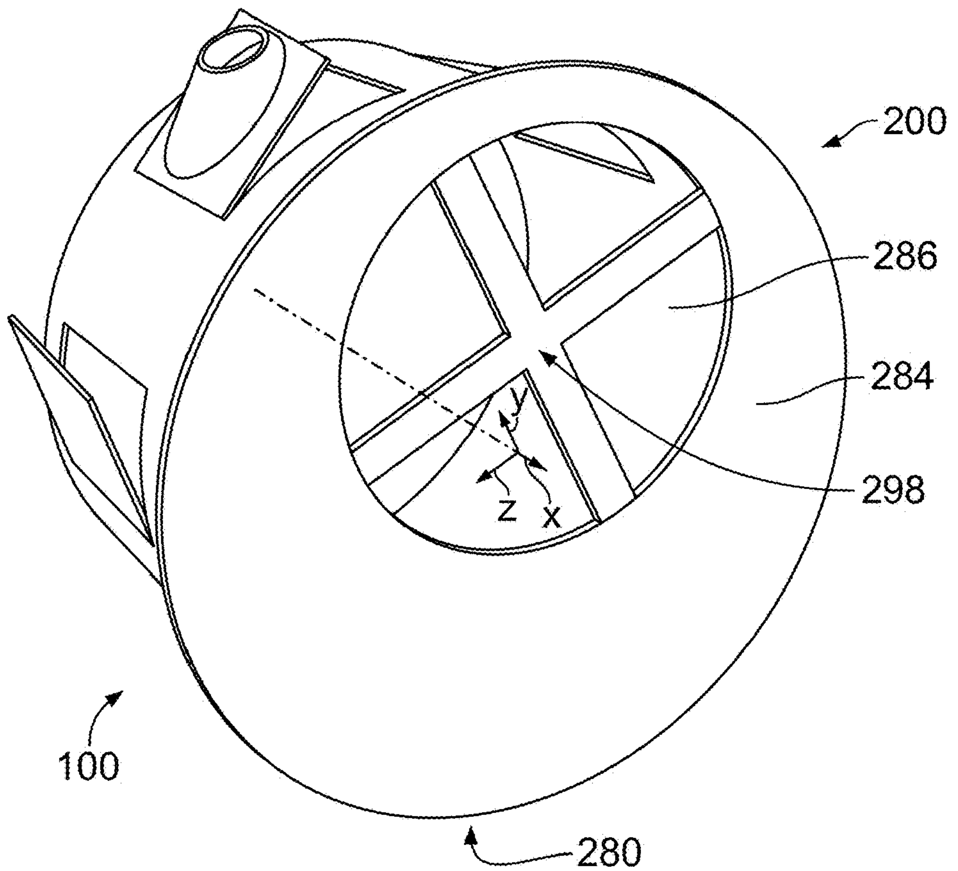
FIG. 17 is a perspective view of another portion of exhaust aftertreatment system of FIG. 4.
Figure 18:
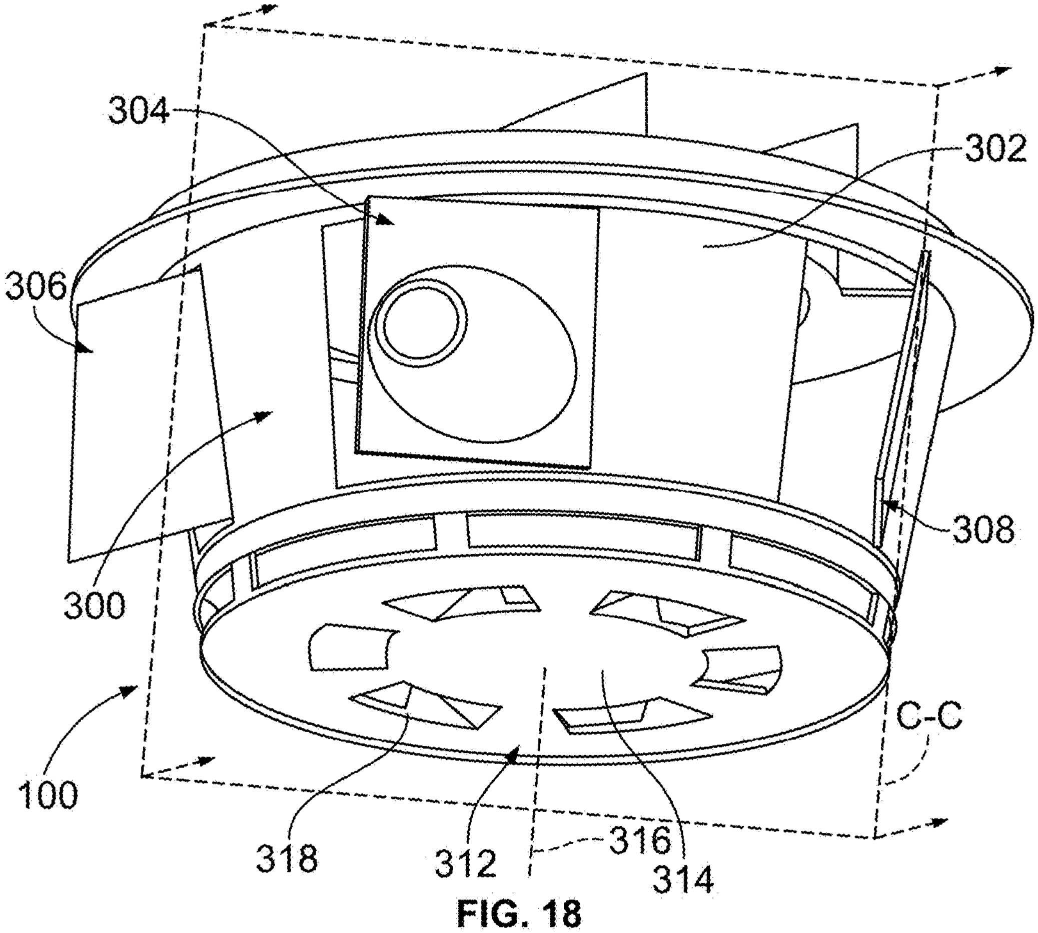
FIG. 18 is a perspective view of another portion of an exhaust aftertreatment system.
Figure 19:
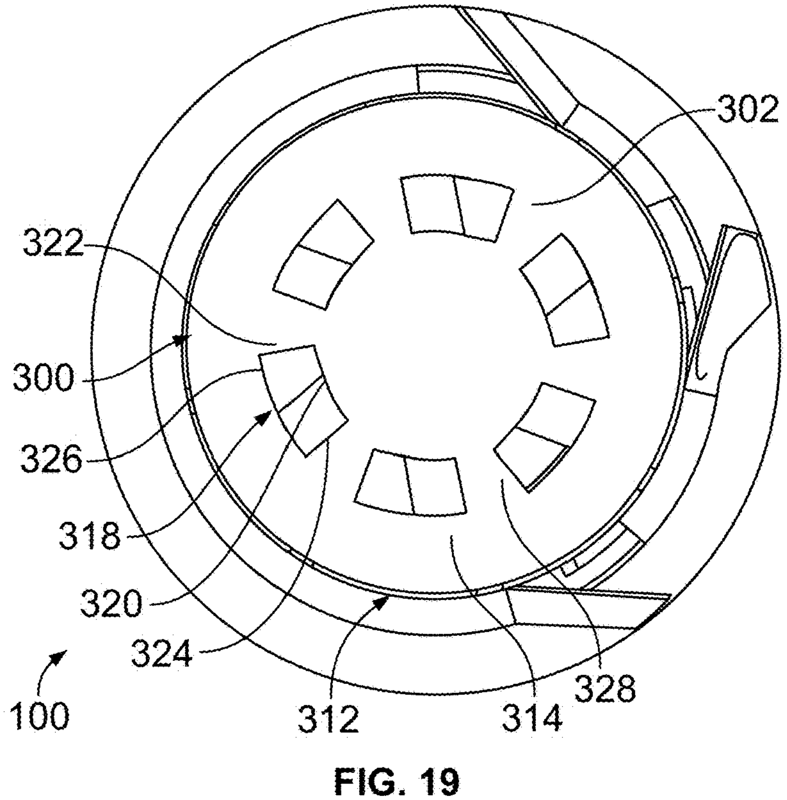
FIG. 19 is a top view of a portion of the exhaust aftertreatment system of FIG. 17 from upstream looking downstream.
Figure 20:
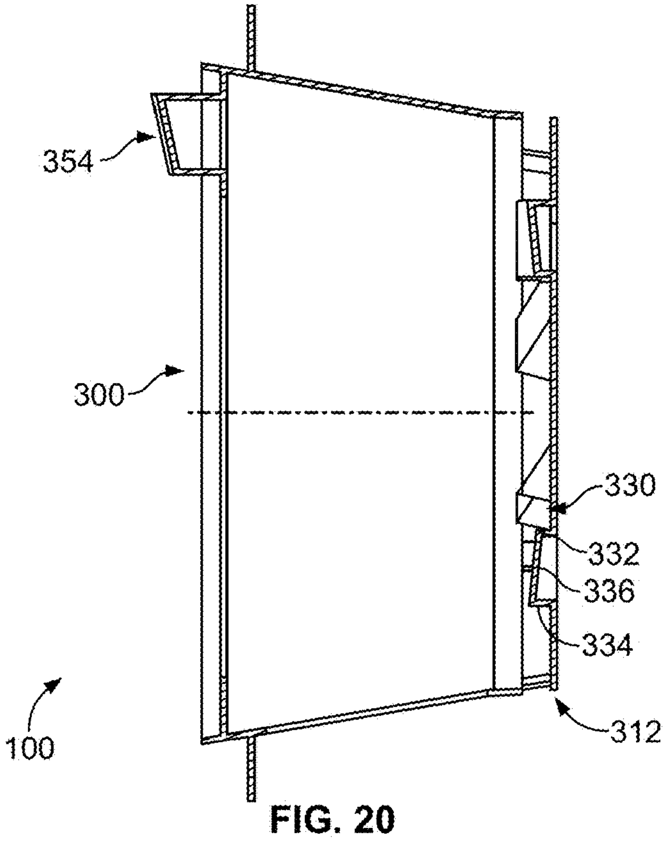
FIG. 20 is a side cross-sectional view of a portion of the exhaust aftertreatment system of FIG. 18 taken along plane C-C.
Figure 21:
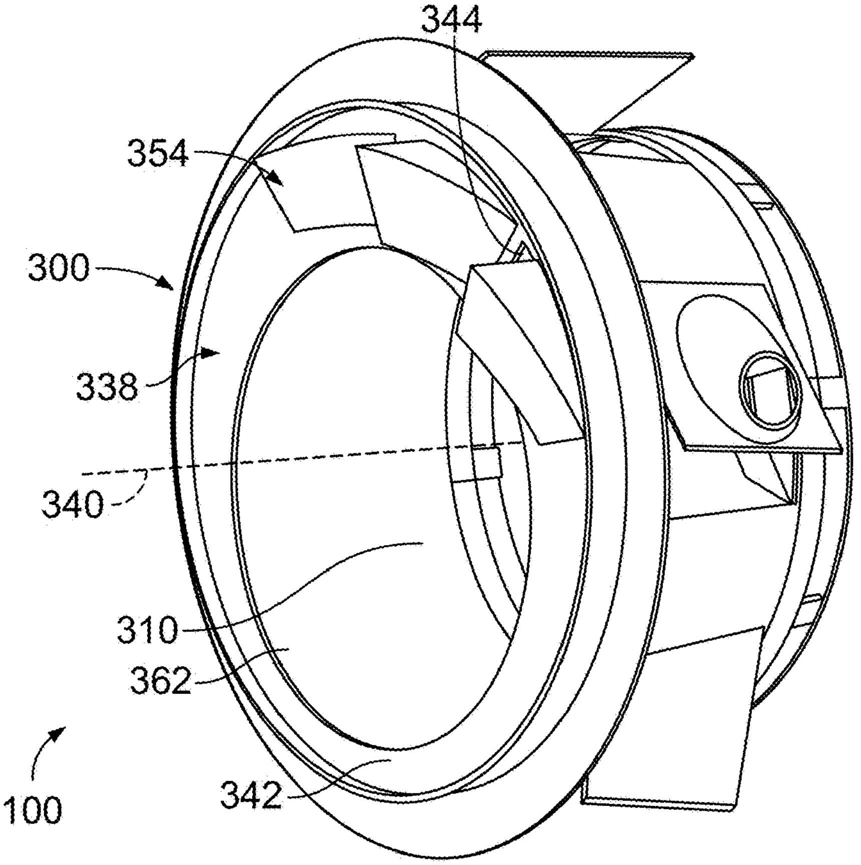
FIG. 21 is a perspective view of a portion of the exhaust aftertreatment system of FIG. 18.
Figure 22:
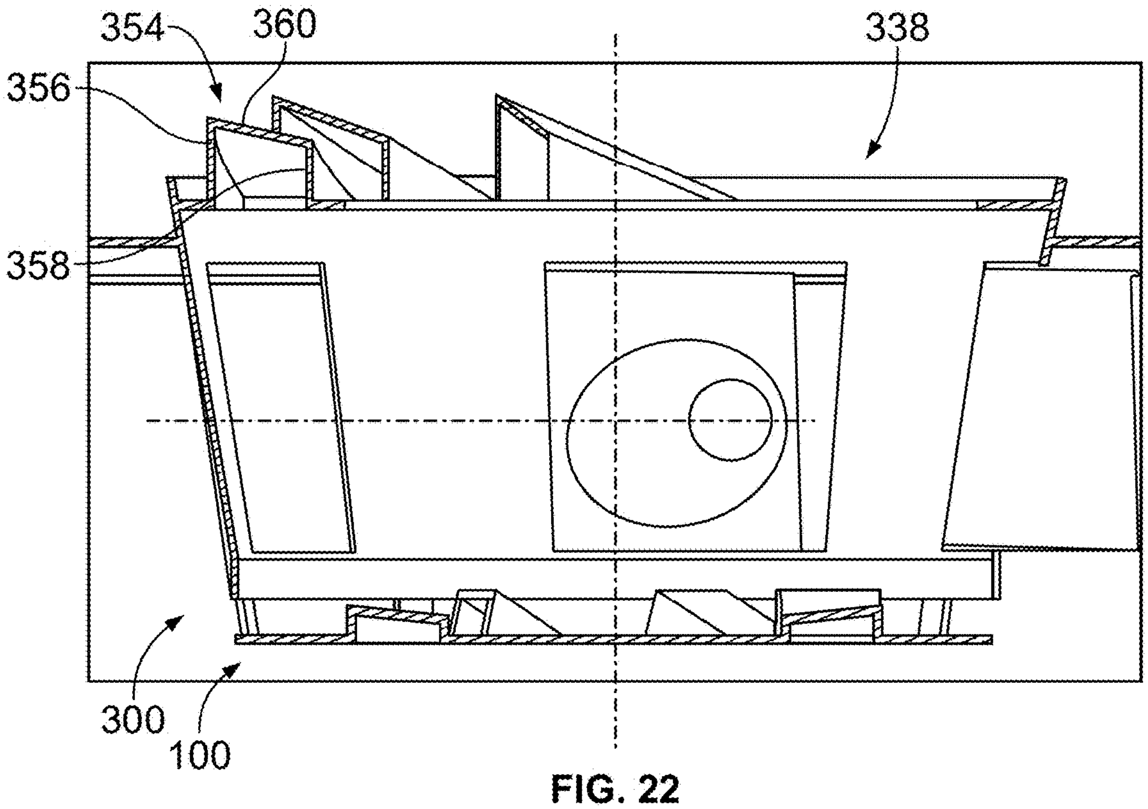
FIG. 22 is another cross-sectional view of a portion of the exhaust aftertreatment system of FIG. 18.
Figure 23:
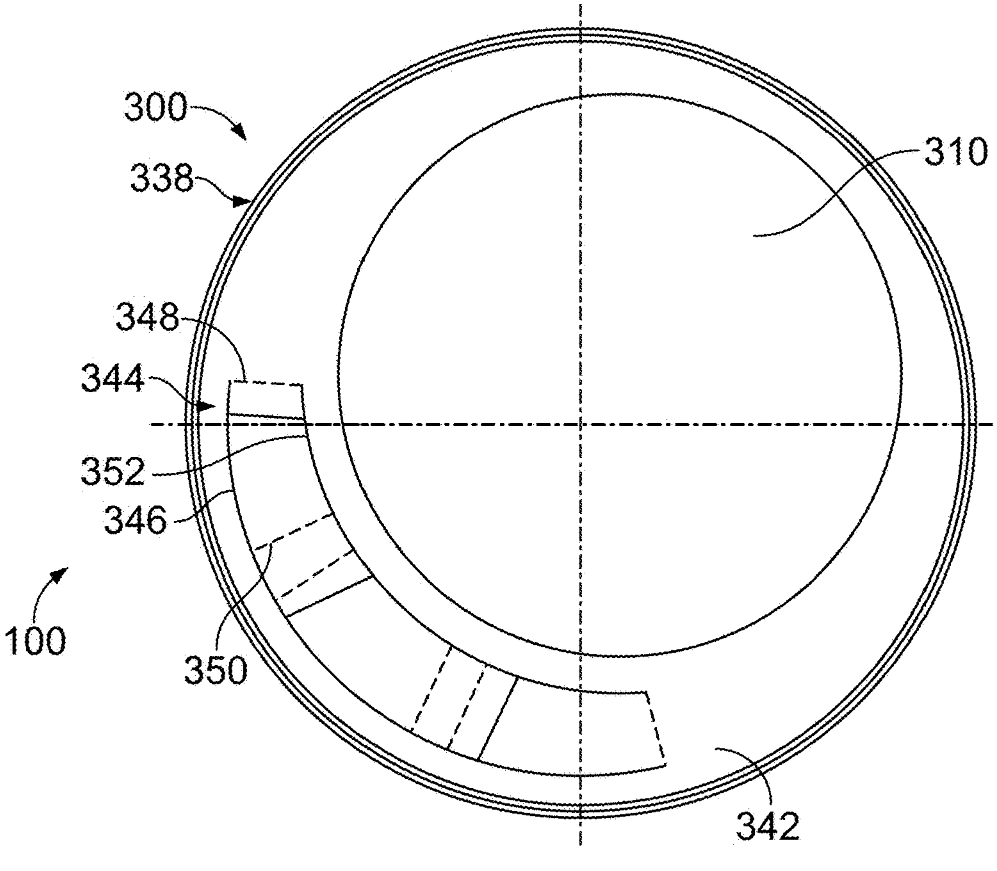
FIG. 23 is a bottom view of a portion of the exhaust aftertreatment system of FIG. 18.

Referring to FIG. 17, the outlet flange 280 may include a plurality of cross-members 298. The plurality of cross-members 298 are coupled to the outlet flange body 284 and extend across the outlet flange opening 286. The plurality of cross-members 298 are configured to impede the flow of the exhaust flowing out of the outlet flange opening 286. For example, as the exhaust flows from the outlet flange opening 286, the exhaust makes contact with the plurality of cross-members 298 and is redirected to flow around the plurality of cross-members 298. Consequently, recirculation at the center of the outlet flange opening 286 is reduced which assists with the regeneration of downstream components.

Referring to FIGS. 18-23, the aftertreatment system 100 includes a mixer 300, according to one embodiment. The mixer 300 is substantially similar to the mixer 200. The mixer 300 includes a mixer body 302. The mixer body 302 is substantially similar to the mixer body 202. The mixer 300 includes an injector plate 304 which is substantially similar to the injector plate 218 and therefore not described in further detail. The mixer 300 further includes a first guide plate 306 which is substantially similar to first guide plate 240 and a second guide plate 308 which is substantially similar to the second guide plate 256 and therefore not described in further detail. The mixer 300 includes a mixer body cavity 310 which is substantially similar to the mixer body cavity 216 and therefore not described in further detail.

The aftertreatment system 100 may include an inlet flange 312 (e.g., panel, coupler, ring, etc.). The inlet flange 312 functions to separate the mixer body 302 from the introduction conduit 109 and support the mixer body 302 within the introduction conduit 109. The inlet flange 312 includes an inlet flange body 314. The inlet flange body 314 is coupled to mixer body 202. The inlet flange body 314 is centered on an inlet flange body axis 316. In some embodiments, the inlet flange body axis 316 is the same as the conduit axis 106. The inlet flange body 314 impedes the flow of the exhaust into the mixer body cavity 310. In some embodiments, the inlet flange 312 is separated from the mixer body by distance approximately in a range of 5 mm to 15 mm (e.g., 4.75 mm, 5 mm, 7 mm, 9 mm, 10 mm, 11 mm, 13 mm, 15 mm, 15.75 mm, etc.).

The inlet flange 312 includes a plurality of inlet flange apertures 318 (e.g., windows holes, etc.). Each of the inlet flange apertures 318 extends through the inlet flange body 314. The inlet flange apertures 318 are arrayed circumferentially around the inlet flange body 314. In some embodiments, the inlet flange apertures 318 are arrayed about the inlet flange body axis 316. Each of the inlet flange apertures 318 are configured to facilitate passage of a portion of the exhaust through the mixer body 302 and into the mixer body cavity 310.

Each of the inlet flange apertures 318 includes a first aperture edge 320. The first aperture edge has a radius of curvature approximately in a range of 60 mm to 100 mm (e.g., 57 mm, 60 mm, 65 mm, 70 mm, 72.5 mm, 75 mm, 80 mm, 85 mm, 90 mm, 95 mm, 100 mm, 105 mm, etc.).

Each of the inlet flange apertures 318 includes a second aperture edge 322 extending from the first aperture edge 320. Each of the inlet flange apertures includes a third aperture edge 324 extending from the first aperture edge 320 and opposite of the second aperture edge 322. The second aperture edge 322 extends from the first aperture edge 320 at a distance approximately in a range of 20 mm to 30 mm (e.g., 19 mm, 20 mm, 21 mm, 21.92 mm, 22 mm, 22.5 mm, 23 mm, 23.64 mm, 24 mm, 25 mm, 26 mm, 27 mm, 27.65 mm, 28 mm, 28.76 mm, 29 mm, 29.2 mm, 29.79 mm, 30 mm, 31.5 mm, etc.). The third aperture edge 324 extends from the first aperture edge 320 at a distance approximately in a range of 20 mm to 30 mm (e.g., 19 mm, 20 mm, 21 mm, 21.92 mm, 22 mm, 22.5 mm, 23 mm, 23.64 mm, 24 mm, 25 mm, 26 mm, 27 mm, 27.65 mm, 28 mm, 28.76 mm, 29 mm, 29.2 mm, 29.79 mm, 30 mm, 31.5 mm, etc.). In some embodiments, the second aperture edge 322 and the third aperture edge 324 extend the same distance from the first aperture edge 320. In some embodiments, the third aperture edge 324 and the second aperture edge 322 extend at a different distance from one another from the first aperture edge 320.

Each of the inlet flange apertures 318 includes a fourth aperture edge 326. The fourth aperture edge 326 extends between the second aperture edge 322 and the third aperture edge 324 and is opposite from the first aperture edge 320. The fourth aperture edge 326 has a radius of curvature approximately in a range of 90 mm to 110 mm (e.g., 85.5 mm, 90 mm, 95 mm, 100 mm, 105 mm, 105.66 mm, 110 mm, 115.5 mm, etc.).

The inlet flange 312 includes a plurality of inlet flange supports 328 (e.g., arms, bars, support structures, etc.). The inlet flange supports 328 are coupled to the inlet flange body 314 and are configured to couple the inlet flange 312 to the introduction conduit 109. Each of the inlet flange supports 328 may define a portion of the inlet flange apertures 318.

The inlet flange 312 includes a plurality of louvers 330 (e.g., guides, guide plates, etc.). The plurality of louvers 330 may include approximately in a range between 1 louver and 10 louvers (e.g., 1 louver, 2 louver, 3 louver, 4 louver, 5 louver, 6 louver, 7 louver, 8 louver, 9 louver, 10 louver, etc.). Each of louvers 330 extend from the inlet flange 312 to within the mixer body cavity 310. Each of the louvers 330 further extend along a portion of an inlet flange aperture 318 of the plurality of the inlet flange apertures 318. Each of the plurality of louvers 330 are configured to receive a portion exhaust flowing through the inlet flange apertures 318 and are configured to cause a portion of the exhaust to swirl while facilitating the flow of the portion of the exhaust to the mixer body cavity 310. Consequently, the plurality of louvers 330 may assist in reducing backpressure of the exhaust as the exhaust flows through the system. Each of the louvers 330 includes a first louver side 332. The first louver side 332 extends from the inlet flange body 314 into the mixer body cavity 310. The first louver side 332 may extend into the mixer body cavity 310 at a length approximately in a range of 10 mm to 15 mm (e.g., 9.5 mm, 10 mm, 11 mm, 12 mm, 12.45 mm, 12.49 mm, 13 mm, 14 mm, 15 mm, 15.75 mm, etc.). Each of the louvers 330 includes a second louver side 334. The second louver side 334 extends from the inlet flange body 314 into the mixer body cavity and is opposite of the first louver side 332. The second louver side 334 may extend into the mixer body cavity 310 at a length approximately in a range of 10 mm to 15 mm (e.g., 9.5 mm, 10 mm, 11 mm, 12 mm, 12.45 mm, 12.49 mm, 13 mm, 14 mm, 15 mm, 15.75 mm, etc.).

Each of the louvers 330 includes a third louver side 336. The third louver side 336 extends from the first louver side 332 to the second louver side 334 at a length approximately in the range of 20 mm to 30 mm (e.g., 19 mm, 20 mm, 21 mm, 22 mm, 23 mm, 24 mm, 25 mm, 26 mm, 27 mm, 27.71 mm, 28 mm, 29 mm, 30 mm, 31.5 mm, etc.). The third louver side 336 is configured to impede a portion of the exhaust flowing through the aperture and cause the portion of the exhaust to change direction so as to swirl as the exhaust enters the mixer body cavity 310. In some embodiments, the plurality of louvers 330 may taper such that a side opposite of the third louver side 336 is flush with the inlet flange body 314.

The aftertreatment system 100 may include an outlet flange 338 (e.g., panel, coupler, ring, etc.). The outlet flange 338 is coupled to the introduction conduit 109. The outlet flange 338 is centered on an outlet flange center axis 340. In some embodiments, the outlet flange center axis 282 is the same as the conduit axis 106. The outlet flange 338 includes an outlet flange body 342. The outlet flange body 342 is centered on the outlet flange center axis 282.

The outlet flange body includes a plurality of outlet flange apertures 344. The plurality of outlet flange apertures 344 extend through the outlet flange body 342. The plurality of outlet flange apertures 344 are arrayed around about the outlet flange center axis 340. Each of the outlet flange apertures 344 are configured to facilitate passage of a portion of the exhaust from the mixer body cavity 310 through the outlet flange body 342.

Each of the outlet flange apertures 344 includes a first outlet aperture edge 346. The first outlet aperture edge has a radius of curvature approximately in a range of 60 mm to 100 mm (e.g., 57 mm, 60 mm, 65 mm, 70 mm, 72.5 mm, 75 mm, 80 mm, 85 mm, 90 mm, 95 mm, 100 mm, 105 mm, etc.).

Each of the outlet flange apertures 344 includes a second outlet aperture edge 348. The second outlet aperture edge 348 extends from the first outlet aperture edge 346. Each of the outlet flange apertures 344 includes a third outlet aperture edge 350. The third outlet aperture edge 350 extends from the first outlet aperture edge 346 and is opposite of the second outlet aperture edge 348. The second outlet aperture edge 348 extends from the first outlet aperture edge 346 at a distance approximately in a range of 20 mm to 30 mm (e.g., 19 mm, 20 mm, 21 mm, 21.92 mm, 22 mm, 22.5 mm, 23 mm, 23.64 mm, 24 mm, 25 mm, 26 mm, 27 mm, 27.65 mm, 28 mm, 28.76 mm, 29 mm, 29.2 mm, 29.79 mm, 30 mm, 31.5 mm, etc.). The third outlet aperture edge 350 extends from the first outlet aperture edge 346 at distance approximately in a range of 20 mm to 30 mm (e.g., 19 mm, 20 mm, 21 mm, 21.92 mm, 22 mm, 22.5 mm, 23 mm, 23.64 mm, 24 mm, 25 mm, 26 mm, 27 mm, 27.65 mm, 28 mm, 28.76 mm, 29 mm, 29.2 mm, 29.79 mm, 30 mm, 31.5 mm, etc.). In some embodiments, the second outlet aperture edge 348 and the third outlet aperture edge 350 extend at the same distance. In other embodiments the second outlet aperture edge 348 and the third outlet aperture edge 350 extend at a different distance.

Each of the outlet flange apertures 344 includes a fourth outlet aperture edge 352. The fourth outlet aperture edge 352 extends between the second outlet aperture edge 348 and the third outlet aperture edge 350 and is opposite from the first outlet aperture edge 346. The fourth outlet aperture edge 352 has a radius of curvature approximately in a range of 90 mm to 110 mm (e.g., 85.5 mm, 90 mm, 95 mm, 100 mm, 105 mm, 105.66 mm, 110 mm, 115.5 mm, etc.).

The outlet flange 338 includes a plurality of outlet flange louvers 354 (e.g., louvers, guides, guide plate, etc.). The plurality of outlet flange louvers 354 may include approximately in a range of 1 outlet flange louver to 10 outlet flange louvers (e.g., 1 outlet flange louver, 2 outlet flange louvers, 3 outlet flange louvers, 4 outlet flange louvers, 5 outlet flange louvers, 6 outlet flange louvers, 7 outlet flange louvers, 8 outlet flange louvers, 9 outlet flange louvers, 10 outlet flange louvers, etc.). Each of the outlet flange louvers 354 extend from the outlet flange body 342 and extend along a portion of an outlet flange aperture 344 of the plurality of outlet flange apertures 344. Each of the plurality of outlet flange louvers 354 are configured to receive a portion of the exhaust flowing from the mixer body cavity 310 downstream and cause the portion of the exhaust to swirl while facilitating the flow downstream. Consequently, the plurality of outlet flange louvers 354 may assist in reducing backpressure of the exhaust as the exhaust flows through the system.

Each of the outlet flange louvers 354 include a first outlet flange louver edge 356. The first outlet flange louver edge 356 extends away from the outlet flange body 342. The first outlet flange louver edge 356 may extend away from the outlet flange body at a length approximately in a range of 15 mm to 30 mm (e.g., 14.25 mm, 15 mm, 16 mm, 17 mm, 17.19 mm, 17.3 mm, 18 mm, 18.7 mm, 19 mm, 20 mm, 21 mm, 22 mm, 23 mm, 23.84 mm, 24 mm, 25 mm, 26 mm, 27 mm, 28 mm, 28.12 mm, 28.41 mm, 29 mm, 30 mm, 31.5 mm, etc.). Each of the outlet flange louvers 354 includes a second outlet flange louver edge 358. The second outlet flange louver edge 358 extends from away from the outlet flange body 342 and is opposite of the first outlet flange louver edge 356. The second outlet flange louver edge 358 extends away from the outlet flange body at a length approximately in a range of 15 mm to 30 mm (e.g., 14.25 mm, 15 mm, 16 mm, 17 mm, 17.19 mm, 17.3 mm, 18 mm, 18.7 mm, 19 mm, 20 mm, 21 mm, 22 mm, 23 mm, 23.84 mm, 24 mm, 25 mm, 26 mm, 27 mm, 28 mm, 28.12 mm, 28.41 mm, 29 mm, 30 mm, 31.5 mm, etc.).

Each of the outlet flange louvers 354 include a third outlet flange louver edge 360. The third outlet flange louver edge 360 extends from the first outlet flange louver edge 356 to the second outlet flange louver edge 358 at a length approximately in a range of 20 mm to 40 mm (e.g., 19 mm, 20 mm, 21 mm, 22 mm, 23 mm, 24 mm, 25 mm, 26 mm, 27 mm, 28 mm, 28.44 mm, 29 mm, 30 mm, 31 mm, 32 mm, 33 mm, 34 mm, 34.27 mm, 35 mm, 35.53 mm, 36 mm, 37 mm, 38 mm, 39 mm, 40 mm, etc.). The third outlet flange louver edge 360 is configured to impede the a portion of the exhaust flowing through the outlet flange aperture 344 and cause the portion of the exhaust to change directions so as to swirl as the exhaust flows downstream from the mixer 300. In some embodiments, the plurality of outlet flange louvers 354 are tapered such that a side opposite of the third outlet flange louver edge 360 is flush with the outlet flange body 342.

The outlet flange 338 further includes an outlet flange opening 362. The outlet flange opening 362 is substantially similar to the outlet flange opening 286 and therefore not described in further detail.

Figure 24:
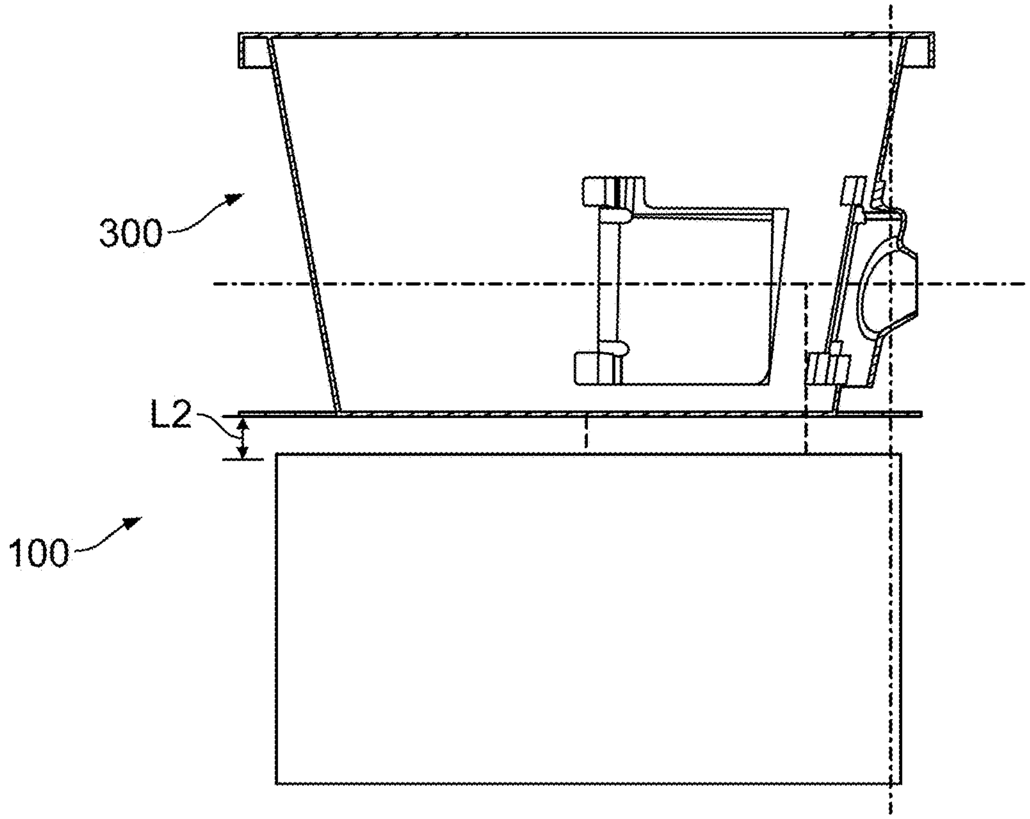
FIG. 24 is a perspective view of a portion of an exhaust aftertreatment system, according to one embodiment.

Referring to FIG. 24, a portion of an aftertreatment system 100 is depicted. The mixer 300 is coupled to the introduction conduit 109. Downstream of the mixer 300, a downstream component (e.g., a first oxidation catalyst member 158, etc.) is coupled the introduction conduit 109. In some embodiments, the downstream component is positioned at a length L2 approximately in a range between 15 mm to 40 mm (e.g., 14.25 mm, 15 mm, 20 mm, 25 mm, 30 mm, 35 mm, 40 mm, etc.).

Figure 25:
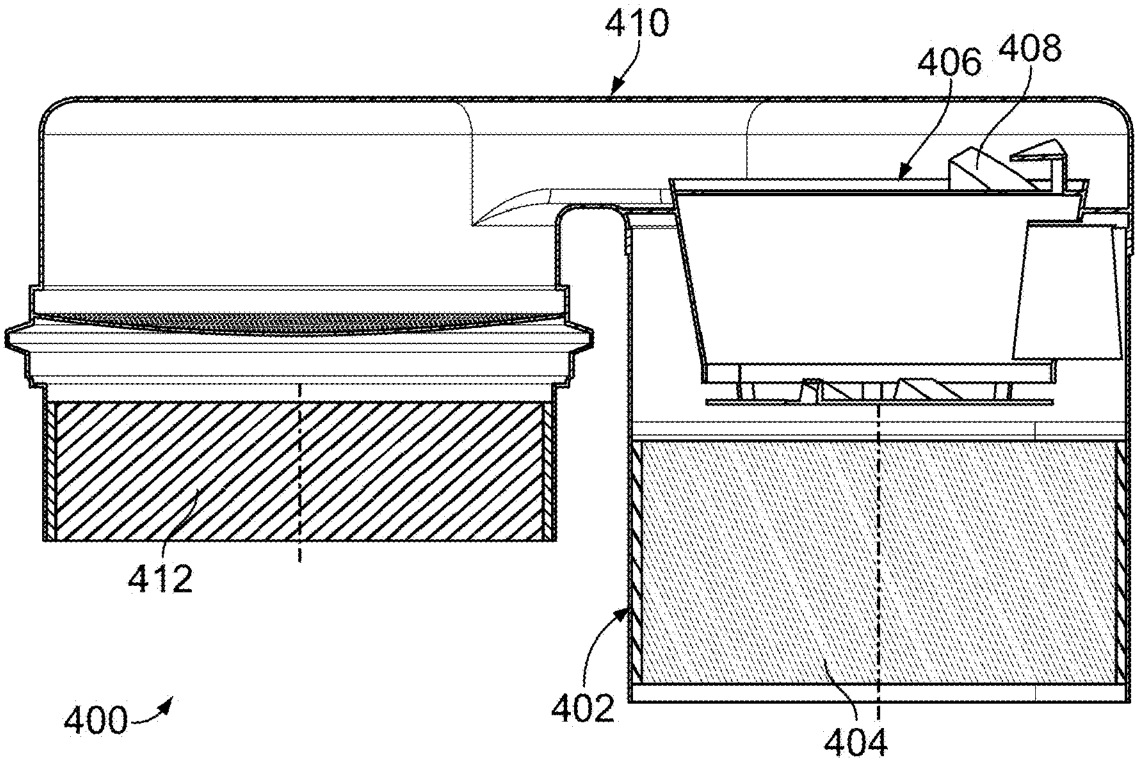
FIG. 25 is a perspective view of an exhaust aftertreatment system according to one embodiment.

Referring to FIG. 25, an aftertreatment system 400 is depicted. The aftertreatment system 400 is substantially similar to the aftertreatment system 100. The aftertreatment system 400 includes various components of the aftertreatment system 100. For example, the aftertreatment system 400 includes an introduction conduit 402 that is substantially similar to the introduction conduit 109. The aftertreatment system 400 includes an upstream catalyst member 404 substantially similar to the upstream catalyst member 138. The aftertreatment system 400 also includes a hydrocarbon decomposition chamber 406 that operates substantially similar to the hydrocarbon decomposition chamber 146. The hydrocarbon decomposition chamber 406 is mixer substantially similar to the mixer 300. The hydrocarbon decomposition chamber 406 includes a plurality of outlet flange louvers 408. The plurality of outlet flange louvers 408 are substantially similar to the plurality of outlet flange louvers 354. The plurality of outlet flange louvers 408 assist in changing the direction of the exhaust flowing from the hydrocarbon decomposition chamber 406.

The aftertreatment system 400 is different from the aftertreatment system 100 in that the aftertreatment system 400 includes an elbow conduit 410. The elbow conduit 410 is positioned downstream of the hydrocarbon decomposition chamber 406 and is contiguous with the introduction conduit 402. The elbow conduit 410 is configured to receive exhaust from the hydrocarbon decomposition chamber 406 in a first direction and facilitate a change of direction of the exhaust. In some embodiments, the plurality of outlet flange louvers 408 assists the elbow conduit in changing the direction. For example, the elbow conduit 410 receives the exhaust in a first direction and causes the exhaust to change from a first direction to a second direction where the second direction is parallel and opposite of the first direction. The exhaust may then flow to an oxidation catalyst member 412. The oxidation catalyst member 412 is substantially similar to the first oxidation catalyst member 158. However, rather than the oxidation catalyst member 412 being aligned with the upstream catalyst member 404, the oxidation catalyst member 412 is adjacent and parallel to the upstream catalyst member 404.

Consequently, the aftertreatment system 400 including the elbow conduit 410 may provide certain benefits. For example, the total length of the aftertreatment system 400 is reduced and total space necessary for the aftertreatment system is reduced.

While the aftertreatment system 100 and aftertreatment system 400 has been shown and described in the context of use with a diesel internal combustion engine, the aftertreatment system 100 and aftertreatment system 400 may be used with other internal combustion engines, such as gasoline internal combustion engines, hybrid internal combustion engines, propane internal combustion engines, dual-fuel internal combustion engines, and other similar internal combustion engines.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, hydrocarbon fluid, an air-hydrocarbon fluid mixture, exhaust, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust aftertreatment system comprising:

an introduction conduit centered on a conduit axis;

a dosing module coupled to the introduction conduit and comprising an injector configured to provide a hydrocarbon fluid into the introduction conduit along an injection axis; and a mixer comprising:

a mixer body disposed within the introduction conduit, the mixer body configured to receive exhaust and the hydrocarbon fluid, a first aperture extending through the mixer body, the first aperture configured to facilitate flow of exhaust through the mixer body, an injector plate coupled to the mixer body along a portion of the first aperture, a portion of the injector plate angled at a first opening angle away from the mixer body, and an injector cone positioned on the injector plate, the injector cone comprising an injection aperture configured to facilitate flow of the hydrocarbon fluid through the injector cone and the injector plate.

2. The exhaust aftertreatment system of claim 1, wherein:

the mixer body is bisected by a mixer body plane that intersects the conduit axis and is orthogonal to the conduit axis;

the portion of the injector plate is centered on a reference axis that extends along the mixer body plane and intersects the conduit axis;

the mixer further comprises:

a second aperture extending through the mixer body, the second aperture configured to facilitate flow of exhaust through the mixer body, and a guide plate coupled to the mixer body along a portion of the second aperture, a portion of the guide plate angled at a second opening angle away from the mixer body, the portion of the guide plate centered on a guide plate axis that extends along the mixer body plane and intersects the conduit axis; and the mixer body, the injector plate, and the guide plate are configured such that the reference axis is separated from the guide plate axis by a first separation angle, the first separation angle being between 30 degrees and 60 degrees.

3. The exhaust aftertreatment system of claim 1, further comprising:

an inlet flange coupled to the mixer body and the introduction conduit, the inlet flange comprising a plurality of inlet flange apertures, each of the inlet flange apertures configured to facilitate flow of exhaust through the inlet flange and around the mixer body; and an outlet flange coupled to the mixer body and the introduction conduit downstream of the inlet flange, the outlet flange comprising an outlet flange opening configured to facilitate flow of exhaust through the outlet flange.

4. The exhaust aftertreatment system of claim 2, further comprising:

a third aperture extending through the mixer body, the third aperture configured to facilitate flow of exhaust through the mixer body; and a second guide plate coupled to the mixer body along a portion of the third aperture, a portion of the second guide plate angled at a third opening angle away from the mixer body, the portion of the second guide plate centered on a second guide plate axis that extends along the mixer body plane and intersect the conduit axis;

wherein the mixer body, the injector plate, and the second guide plate are configured such that the reference axis is separated from the second guide plate axis by a second separation angle, the second separation angle being between 300 degrees and 330 degrees.

5. The exhaust aftertreatment system of claim 2, wherein:

the mixer body is bisected by a mixer body second plane that intersects the conduit axis and is orthogonal to the conduit axis and the mixer body plane; and the mixer body configured such that the reference axis is separated from by a reference angle from the mixer body second plane, the reference angle being between 2 degrees to 10 degrees.

6. The exhaust aftertreatment system of claim 4, wherein:

the injector plate comprises an injector plate side, the injector plate side coupling the injector plate to the mixer body along a portion of the first aperture and facilitating a portion of the flow of exhaust through the first aperture;

the guide plate comprises a guide plate side coupling the guide plate to the mixer body along a portion of the second aperture and to facilitating flow of exhaust through the second aperture; and the second guide plate comprises a second guide plate side coupling the second guide plate to the mixer body along a portion of the third aperture and facilitating flow of exhaust through the third aperture.

7. The exhaust aftertreatment system of claim 3, wherein:

the outlet flange is bisected by an outlet flange plane that intersects the conduit axis and is orthogonal to the conduit axis;

the outlet flange is centered on an outlet flange center axis which intersects the outlet flange plane and is orthogonal to the outlet flange plane; and the outlet flange opening is centered on an outlet flange opening center axis, the outlet flange opening center axis intersecting and orthogonal the outlet flange plane and offset between 25 mm to 45 mm in a horizontal direction along the outlet flange plane and in a range of 25 mm to 45 mm in a vertical direction along the outlet flange plane.

8. The exhaust aftertreatment system of claim 1, further comprising:

an inlet flange comprising:

an inlet flange aperture extending through the inlet flange, the inlet flange aperture configured to facilitate flow of exhaust through the inlet flange and into the mixer body, and a louver extending from the inlet flange to within the mixer body along a portion of the inlet flange aperture and configured to receive exhaust flowing through the inlet flange aperture.

9. The exhaust aftertreatment system of claim 8, wherein:

the inlet flange further comprises a plurality of support structures disposed circumferentially between the inlet flange and the mixer body, each of the support structures configured to couple the inlet flange to the mixer body; and at least two of the support structures from the plurality of support structures, the mixer body, and the inlet flange form an aperture between the inlet flange and the mixer body, the aperture configured to facilitate flow of exhaust within the mixer body.

10. A mixer for an exhaust aftertreatment system comprising:

a mixer body centered on a mixer body center axis and configured to receive exhaust and a hydrocarbon fluid;

a first aperture extending through the mixer body, the first aperture configured to facilitate flow of exhaust through the mixer body; and a first guide plate coupled to the mixer body along a portion of the first aperture and centered on a first guide plate center axis, the first guide plate comprising:

a first guide plate first flange and a first guide plate second flange that couple a portion of the first guide plate to the mixer body, a first guide plate panel contiguous with the first guide plate second flange, the first guide plate panel forming a first guide plate flow aperture, a first guide plate sidewall contiguous with the first guide plate first flange and the first guide plate panel, the first guide plate sidewall configured to facilitate flow between the first guide plate panel and the mixer body, and a first guide plate tab positioned within and along a portion of the first aperture and contiguous with the first guide plate panel, wherein the first guide plate tab couples the first guide plate to the mixer body and is configured to prevent flow of exhaust along an edge of the first guide plate panel.

11. The mixer of claim 10, further comprising:

a second aperture through the mixer body, the second aperture configured to facilitate flow of exhaust through the mixer body;

an injector plate coupled to the mixer body along a portion of the second aperture and centered on a reference axis;

a mixer body first plane orthogonal to the mixer body center axis; and a mixer body second plane orthogonal to each of the mixer body center axis and the mixer body first plane;

wherein the reference axis is separated from the mixer body second plane by a reference angle, the reference angle being in a range between 2 degrees to 10 degrees; and wherein the first guide plate center axis is at a first separation angle from the reference axis, the first separation angle is between 30 degrees and 60 degrees.

12. The mixer of claim 11, further comprising:

a third aperture extending through the mixer body, the third aperture configured to facilitate flow of exhaust through the mixer body, a second guide plate coupled to the mixer body along a portion of the third aperture and positioned on a second guide plate axis, the second guide plate comprising:

a second guide plate first flange and a second guide plate second flange that couple a portion of second guide plate to the mixer body, a second guide plate panel contiguous with each of the second guide plate second flange, the second guide plate panel forming a second guide plate flow aperture;

a second guide plate sidewall contiguous with the second guide plate first flange and the second guide plate panel, the second guide plate sidewall configured to facilitate flow between the second guide plate panel and the mixer body, and a second guide plate tab positioned within and along a portion of the third aperture and contiguous with the second guide plate panel, wherein the second guide plate tab couples the second guide plate to the mixer body and prevents flow of exhaust along an edge of the second guide plate panel; and an injector cone positioned on the injector plate, the injector cone comprising an injection aperture configured to facilitate flow of the hydrocarbon fluid through the injector cone and the injector plate.

13. The mixer of claim 12, further comprising:

a mixer body first plane orthogonal to the mixer body center axis; and a mixer body second plane orthogonal to each of the mixer body center axis and the mixer body first plane;

wherein the reference axis is separated from the mixer body second plane by a reference angle, the reference angle being in a range between 2 degrees to 10 degrees; and wherein the second guide plate axis is at a second separation angle from the reference axis, the second separation angle is between 300 degrees and 330 degrees.

14. An exhaust aftertreatment system comprising:

the mixer of claim 10;

an introduction conduit centered on a conduit axis; and an outlet flange coupled to the mixer body and the introduction conduit, the outlet flange comprising:

an outlet flange opening configured to facilitate flow of exhaust through the outlet flange, and a plurality of outlet flange apertures defined around the outlet flange opening.

15. The exhaust aftertreatment system of claim 14, wherein:

the outlet flange is bisected by an outlet flange plane that intersects the conduit axis and is orthogonal to the conduit axis;

the outlet flange is centered on an outlet flange center axis which intersects the outlet flange plane and is orthogonal to the outlet flange plane; and the outlet flange opening is centered on an outlet flange opening center axis, the outlet flange opening center axis intersecting and orthogonal the outlet flange plane and offset between 25 mm to 45 mm in a horizontal direction along the outlet flange plane and in a range of 25 mm to 45 mm in a vertical direction along the outlet flange plane.

16. The exhaust aftertreatment system of claim 15, wherein the outlet flange is further comprising a plurality of outlet flange louvers extending from an edge of each of the plurality of outlet flange apertures, the plurality of outlet flange louvers are configured to receive a portion of exhaust from the mixer body causing exhaust to swirl moving downstream in the exhaust aftertreatment system.

17. The exhaust aftertreatment system of claim 14, further comprising:

an inlet flange coupled to the mixer body and the introduction conduit and positioned a distance in a range of 5 mm to 15 mm away from the mixer body, the inlet flange comprising a plurality of inlet flange apertures, each of the inlet flange apertures configured to facilitate flow of exhaust through the inlet flange and around the mixer body.

18. An aftertreatment system comprising: a mixer comprising:

a mixer body defining a mixer body cavity, the mixer body centered on a mixer body center axis and configured to receive exhaust and a hydrocarbon fluid;

a first aperture, a second aperture, and a third aperture extending through the mixer body, each of the first aperture, the second aperture, and the third aperture configured to facilitate flow of exhaust through the mixer body;

an injector plate coupled to the mixer body along a portion of the first aperture and centered on a reference axis, the injector plate defining an injector plate aperture angled at a first opening angle away from the mixer body;

a first guide plate coupled to the mixer body along a portion of the second aperture adjacent to the injector plate, a portion of the first guide plate angled at a second opening angle from the mixer body defining a first guide plate flow aperture;

a second guide plate coupled to the mixer body along a portion of the third aperture adjacent to the injector plate opposite the first guide plate, a portion of the second guide plate angled at a third opening angle from the mixer body defining a second guide plate flow aperture; and an injector cone positioned on the injector plate, the injector cone comprising an injection aperture configured to facilitate flow of the hydrocarbon fluid through the injector cone and the injector plate along an injection axis;

wherein the first guide plate flow aperture is configured to facilitate the flow of exhaust into the mixer body cavity away from the injection axis and the second guide plate flow aperture is configured to facilitate the flow of exhaust into the mixer body cavity toward the injection axis to facilitate swirling of exhaust.

19. The aftertreatment system of claim 18, wherein the portion of the first guide plate is angled at the second opening angle away from the mixer body and the second guide plate is angled at the third opening angle away from the mixer body, the first opening angle and the second opening angle in a range between 15 degrees and 30 degrees.

20. The aftertreatment system of claim 18, wherein the portion of the first guide plate is angled at the second opening angle inward and towards the mixer body center axis and the second guide plate is angled at the third opening angle inward and towards the mixer body center axis, the first opening angle and the second opening angle in a range between 15 degrees and 30 degrees.

* * * * *